US012563393B2

(12) United States Patent
Mavureddi Dhanasekaran et al.

(10) Patent No.: US 12,563,393 B2
(45) Date of Patent: Feb. 24, 2026

(54) DETERMINING AUTHENTICATION CREDENTIALS FOR A DEVICE-TO-DEVICE SERVICE

(71) Applicant: Nokia Technologies Oy, Espoo (FI)

(72) Inventors: Ranganathan Mavureddi Dhanasekaran, Munich (DE); Jing Ping, Chengdu (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/966,275

(22) Filed: Dec. 3, 2024

(65) Prior Publication Data

US 2025/0175792 A1     May 29, 2025

Related U.S. Application Data

(63) Continuation of application No. PCT/CN2022/129099, filed on Nov. 1, 2022.

(51) Int. Cl.
*H04W 12/06*     (2021.01)
*H04W 12/63*     (2021.01)
*H04W 88/04*     (2009.01)

(52) U.S. Cl.
CPC ........... *H04W 12/06* (2013.01); *H04W 12/63* (2021.01); *H04W 88/04* (2013.01)

(58) Field of Classification Search
CPC ..... H04W 12/06; H04W 84/12; H04W 8/005;

H04W 48/16; H04W 4/80; H04W 76/10; H04W 84/18; H04W 4/02; H04W 4/029; H04W 12/08; H04W 48/18; H04W 88/02; H04W 76/12
See application file for complete search history.

(56) References Cited

U.S. PATENT DOCUMENTS

| | | | | |
|---|---|---|---|---|
| 2019/0110238 A1* | 4/2019 | Buckley | ................. | H04W 8/06 |
| 2021/0337381 A1* | 10/2021 | Paladugu | .............. | H04W 12/71 |
| 2022/0279348 A1* | 9/2022 | Youn | .................... | H04W 12/06 |

OTHER PUBLICATIONS

ETSI TS 124 501 v17.7.1 (Jul. 2022) Technical Specification; 981 pages.
Supplementary European Search Report; Application EP22963847; 3 pages; Jul. 8, 2025.
ZTE: Update the step 2-5 in clause 6.3.3.3.2'; 3GPP TSG-SA3 Meeting #106-e, 14-25; 3 pages; Feb. 2022.

* cited by examiner

*Primary Examiner* — Kwasi Karikari
(74) *Attorney, Agent, or Firm* — Duft & Bornsen, PC

(57) ABSTRACT

There is provided an apparatus for a network node comprising means for receiving an indication of a serving network name of a first user equipment, the first user equipment configured to operate as a relay between a second user equipment and a network by providing a proximity-based service between the first user equipment and the second user equipment, means for determining an authentication vector for a proximity-based service authentication for the second user equipment based on the serving network name of the first user equipment; and means for providing an indication of the serving network name of the first user equipment to the second user equipment.

16 Claims, 24 Drawing Sheets

Figure 6:
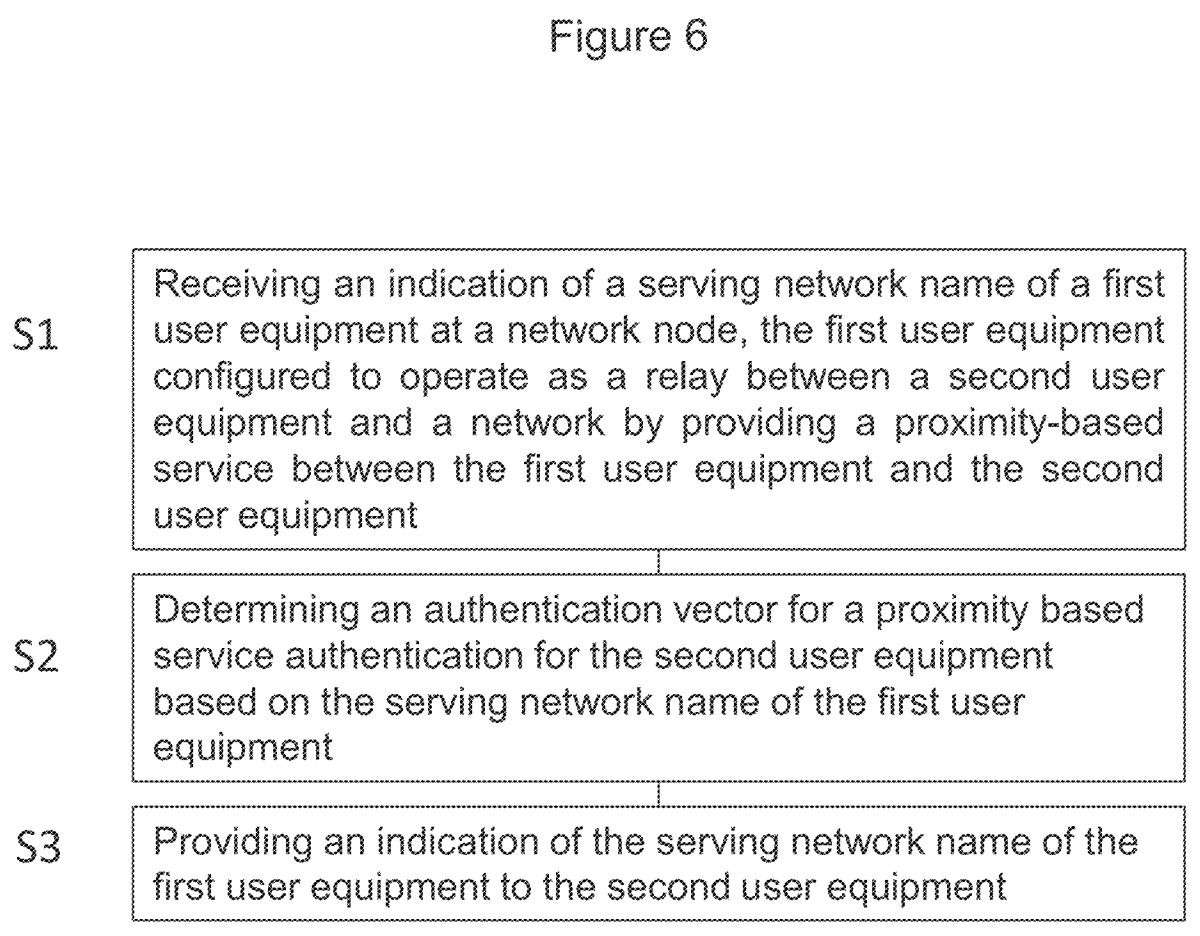

Receiving an indication of a serving network name of a first user equipment at a network node, the first user equipment configured to operate as a relay between a second user equipment and a network by providing a proximity-based service between the first user equipment and the second user equipment

S2

Determining an authentication vector for a proximity based service authentication for the second user equipment based on the serving network name of the first user equipment

S3

Providing an indication of the serving network name of the first user equipment to the second user equipment

Figure 7:
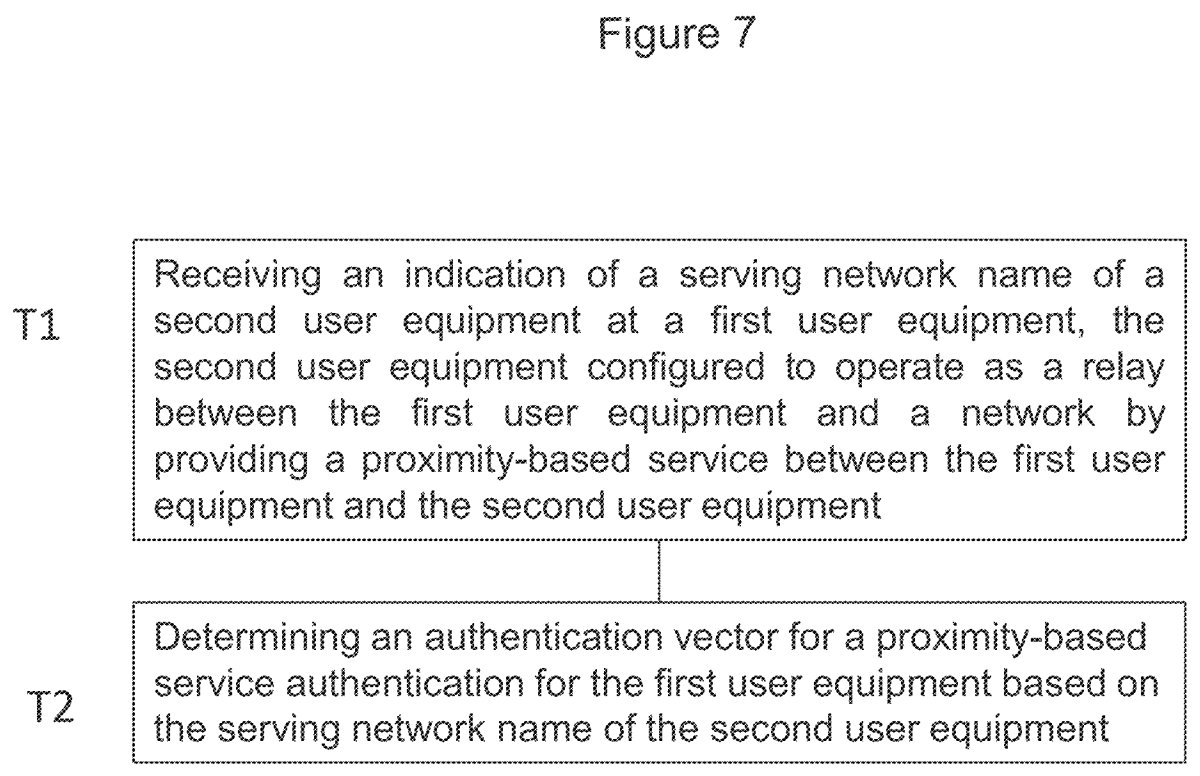

Receiving an indication of a serving network name of a second user equipment at a first user equipment, the second user equipment configured to operate as a relay between the first user equipment and a network by providing a proximity-based service between the first user equipment and the second user equipment

T2

Determining an authentication vector for a proximity-based service authentication for the first user equipment based on the serving network name of the second user equipment

Figure 8:
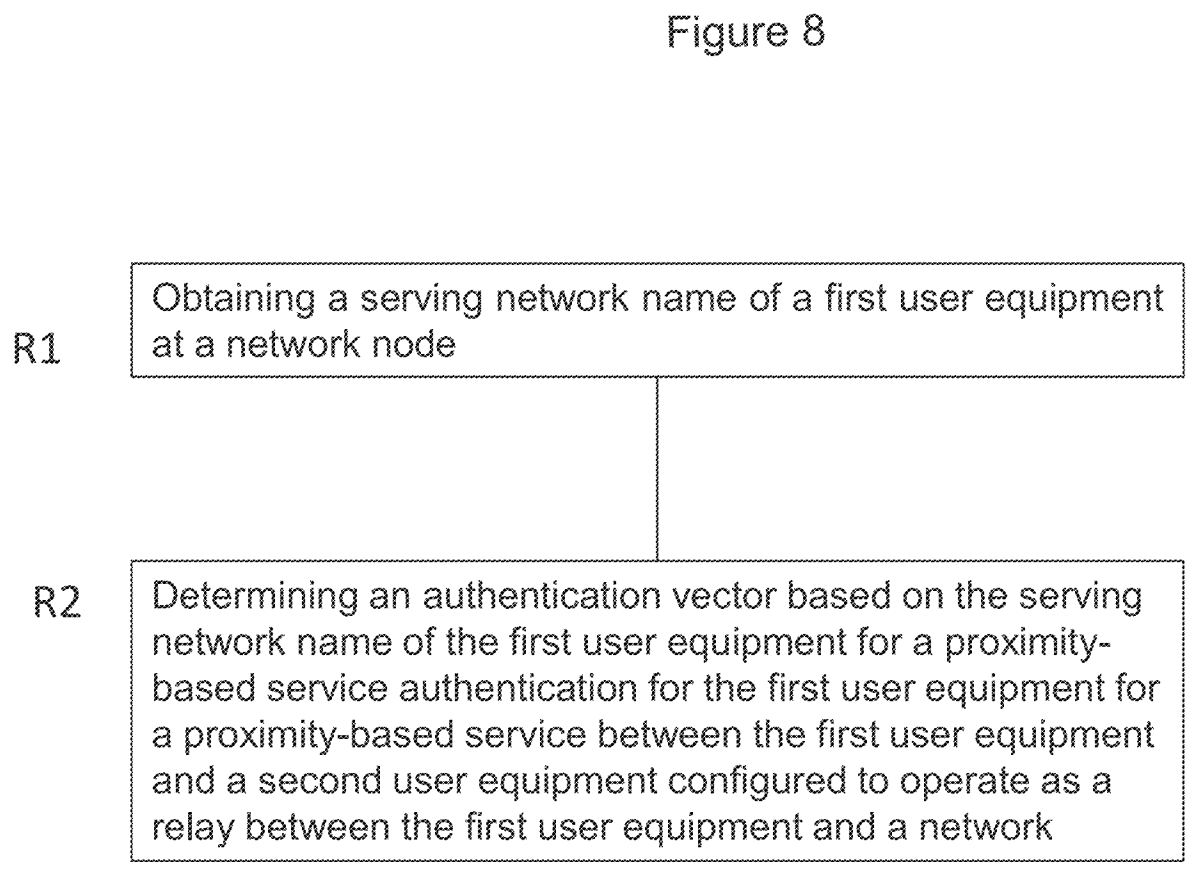

Obtaining a serving network name of a first user equipment at a network node

R2

Determining an authentication vector based on the serving network name of the first user equipment for a proximity-based service authentication for the first user equipment for a proximity-based service between the first user equipment and a second user equipment configured to operate as a relay between the first user equipment and a network

Figure 9:
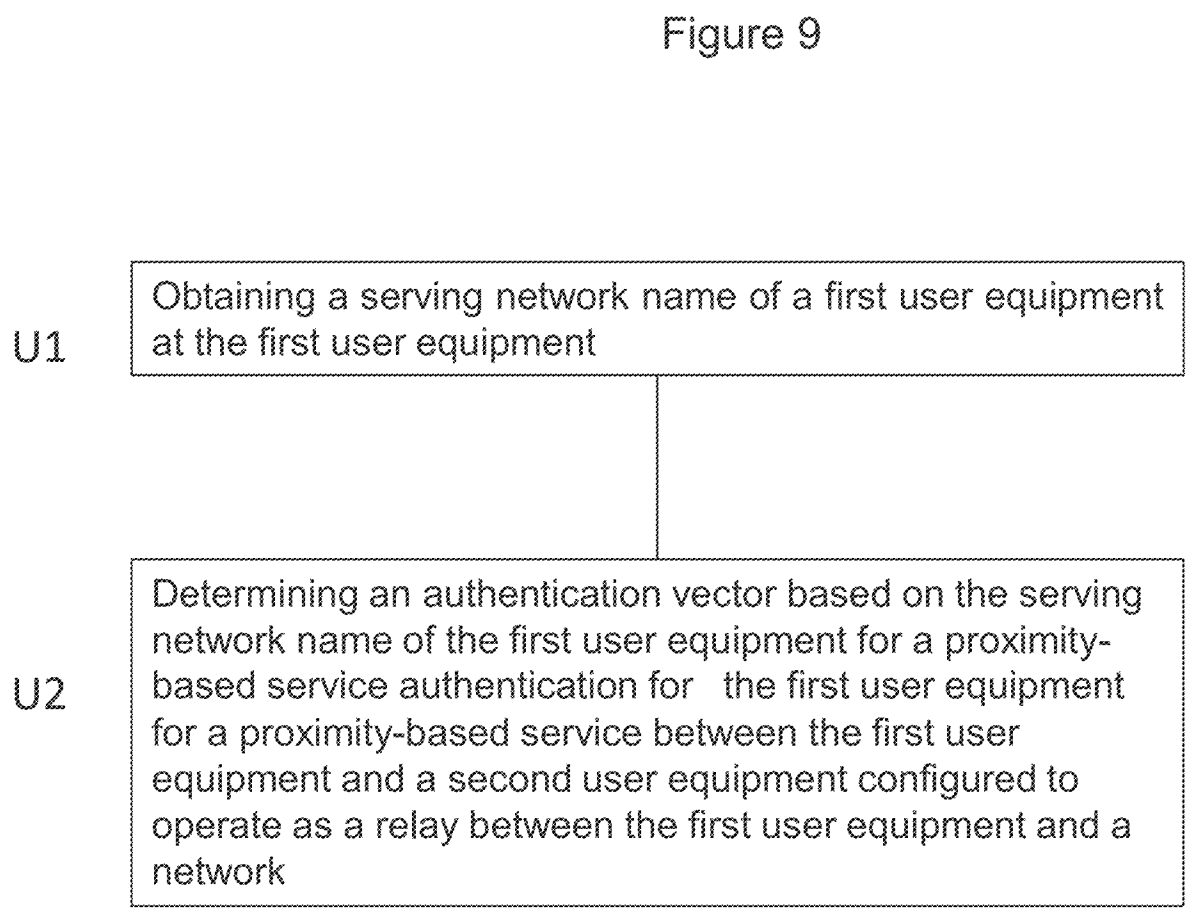

Obtaining a serving network name of a first user equipment at the first user equipment

U2

Determining an authentication vector based on the serving network name of the first user equipment for a proximity-based service authentication for the first user equipment for a proximity-based service between the first user equipment and a second user equipment configured to operate as a relay between the first user equipment and a network

Figure 10a

Remote UE

1a. Remote UE is registered, authenticated by Remote Network

1c.Model A or B discovery (TS 23.304 clause 6.3.1)

2. ProSe Direct Link Establishment Request (SUCI,Nonce_1,Relay Service Code)

Relay UE-to-Network

1b. Relay UE is registered, authenticated by Relay Network

AMF of Relay UE

3. Relay Key Request (SUCI,Nonce_1,Relay Service Code, transaction identifier)

4. Authorize Relay UE

5.Nausf_UEauthenticate_ProseAuthenticate_Request (SUCI,Nonce_1, Relay Service Code)

AUSF of Remote UE

UDM of Remote UE

PAnF of Remote UE

Figure 13b

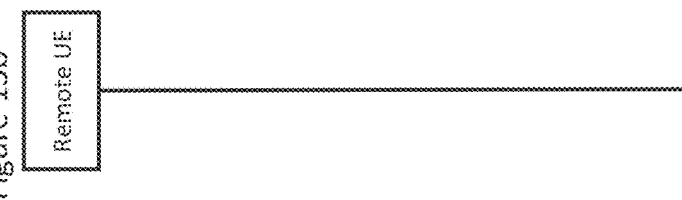

PAnF of Remote UE

UDM of Remote UE

AUSF of Remote UE

AMF of Relay UE

Relay UE-to-Network

Remote UE

6a.Nudm_UEauthenticaate GetProseAV Request (SUCI,Nonce_1, Relay Service Code, Relay UE SNN)

6b.Generate Authentication vector

K   RAND   AMF   SQN$_{HE}$ cryptographic functions (f1..f5)

MAC   XRES   CK   IK   AK

CK ∥ IK

SQN$_{HE}$ ⊕ AK

KDF

CK', IK'

AUTN = SQN$_{HE}$ ⊕ AK ∥ AMF ∥ MAC

EAP-AKA/AV = RAND, AUTN,XRES, CK', IK'

6c.Nudm_UEauthenticaate  GetProseAV Response (authType=5G AKA, SUPI, RID)

6d.store XRES* & calculate HRES*

DETERMINING AUTHENTICATION CREDENTIALS FOR A DEVICE-TO-DEVICE SERVICE

FIELD

The present application relates to methods, apparatuses, computer programs and systems for determining authentication credentials for a device-to-device service, and in particular but not exclusively to determining an authentication vector based on a serving network name (SNN) for use in proximity-based services (ProSe).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example Wireless Local Area Networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the Long-Term Evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus for a network node comprising means for receiving an indication of a serving network name of a first user equipment, the first user equipment configured to operate as a relay between a second user equipment and a network by providing a proximity-based service between the first user equipment and the second user equipment, means for determining an authentication vector for a proximity-based service authentication for the second user equipment based on the serving network name of the first user equipment and means for providing an indication of the serving network name of the first user equipment to the second user equipment.

The apparatus may further comprise means for providing authentication information to the second user equipment, wherein the authentication information comprises the indication of the serving network name of the first user equipment.

The apparatus may further comprise means for providing the authentication information in at least one of the following: a proximity-based service authentication response, a proximity-based service authentication request or an extensible authentication protocol message.

The apparatus may further comprise means for receiving the serving network name of the first user equipment via at least one of the following: an access and mobility management function associated with the first user equipment or an authentication server function associated with the second user equipment.

The network node may implement a unified data management.

The apparatus may comprise the network node, be the network node, or be comprised in the network node.

In a second aspect there is provided an apparatus for a first user equipment, comprising means for receiving an indication of a serving network name of a second user equipment, the second user equipment configured to operate as a relay between the first user equipment and a network by providing a proximity-based service between the first user equipment and the second user equipment and means for determining an authentication vector for a proximity-based service authentication for the first user equipment based on the serving network name of the second user equipment.

The apparatus may further comprise means for receiving authentication information at the first user equipment, wherein the authentication information comprises the indication of the serving network name of the second user equipment.

The apparatus may further comprise means for receiving the authentication information in an extensible authentication protocol message.

The apparatus may further comprise the first user equipment, be the first user equipment, or be comprised in the first user equipment.

In a third aspect there is provided an apparatus for a network node, comprising means for obtaining a serving network name of a first user equipment and means for determining an authentication vector based on the serving network name of the first user equipment for a proximity-based service authentication for the first user equipment for a proximity-based service between the first user equipment and a second user equipment configured to operate as a relay between the first user equipment and a network.

The apparatus may further comprise means for providing an extensible authentication protocol message to the first user equipment, wherein the extensible authentication protocol challenge message comprises the serving network name of the first user equipment.

The serving network name of the first user equipment may be stored at a universal subscriber identity module of the first user equipment.

The apparatus may further comprise means for obtaining the serving network name of the first user equipment by retrieving it from a storage function.

The network node may implement a unified data management.

The apparatus may comprise the network node, be the network node, or be comprised in the network node.

In a fourth aspect there is provided an apparatus for a first user equipment, comprising means for obtaining a serving network name of the first user equipment and means for determining an authentication vector based on the serving network name of the first user equipment for a proximity-based service authentication for the first user equipment for a proximity-based service between the first user equipment and a second user equipment configured to operate as a relay between the first user equipment and a network.

The apparatus may further comprise means for receiving authentication information, wherein the authentication information comprises the serving network name of the first user equipment.

The apparatus may further comprise means for receiving the authentication information in an extensible authentication protocol message.

The apparatus may further comprise means for obtaining the serving network name of the first user equipment by retrieving it from a universal subscriber identity module associated with the first user equipment.

The apparatus may comprise the first user equipment, be the first user equipment, or be comprised in the first user equipment.

In a fifth aspect there is provided a method comprising receiving an indication of a serving network name of a first user equipment at a network node, the first user equipment configured to operate as a relay between a second user equipment and a network by providing a proximity-based service between the first user equipment and the second user equipment, determining an authentication vector for a proximity-based service authentication for the second user equipment based on the serving network name of the first user equipment and providing an indication of the serving network name of the first user equipment to the second user equipment.

The method may further comprise providing authentication information to the second user equipment, wherein the authentication information comprises the indication of the serving network name of the first user equipment.

The method may further comprise providing the authentication information in at least one of the following: a proximity-based service authentication response, a proximity-based service authentication request or an extensible authentication protocol message.

The method may further comprise receiving the serving network name of the first user equipment via at least one of the following: an access and mobility management function associated with the first user equipment or an authentication server function associated with the second user equipment.

In a sixth aspect there is provided a method comprising receiving at a first user equipment an indication of a serving network name of a second user equipment, the second user equipment configured to operate as a relay between the first user equipment and a network by providing a proximity-based service between the first user equipment and the second user equipment and determining an authentication vector for a proximity-based service authentication for the first user equipment based on the serving network name of the second user equipment.

The method may further comprise receiving authentication information at the first user equipment, wherein the authentication information comprises the indication of the serving network name of the second user equipment.

The method may further comprise receiving the authentication information in an extensible authentication protocol message.

In a seventh aspect there is provided a method, comprising obtaining a serving network name of a first user equipment at a network node and determining an authentication vector based on the serving network name of the first user equipment for a proximity-based service authentication for the first user equipment for a proximity-based service between the first user equipment and a second user equipment configured to operate as a relay between the first user equipment and a network.

The method may further comprise providing an extensible authentication protocol message to the first user equipment, wherein the extensible authentication protocol challenge message comprises the serving network name of the first user equipment.

The serving network name of the first user equipment may be stored at a universal subscriber identity module of the first user equipment.

The method may further comprise obtaining the serving network name of the first user equipment by retrieving it from a storage function.

In an eighth aspect there is provided a method comprising obtaining a serving network name of a first user equipment at the first user equipment and determining an authentication vector based on the serving network name of the first user equipment for a proximity-based service authentication for the first user equipment for a proximity-based service between the first user equipment and a second user equipment configured to operate as a relay between the first user equipment and a network.

The method may further comprise receiving authentication information, wherein the authentication information comprises the serving network name of the first user equipment.

The method may further comprise receiving the authentication information in an extensible authentication protocol message.

The method may further comprise obtaining the serving network name of the first user equipment by retrieving it from a universal subscriber identity module associated with the first user equipment.

In a ninth aspect there is provided an apparatus for a network node, comprising: at least one processor and at least one memory storing instructions that, when executed by the at least one processor, cause the apparatus at least to receive an indication of a serving network name of a first user equipment, the first user equipment configured to operate as a relay between a second user equipment and a network by providing a proximity-based service between the first user equipment and the second user equipment, determine an authentication vector for a proximity-based service authentication for the second user equipment based on the serving network name of the first user equipment and provide an indication of the serving network name of the first user equipment to the second user equipment.

The apparatus may further be caused to provide authentication information to the second user equipment, wherein the authentication information comprises the indication of the serving network name of the first user equipment.

The apparatus may further be caused to provide the authentication information in at least one of the following:

a proximity-based service authentication response, a proximity-based service authentication request or an extensible authentication protocol message.

The apparatus may further be caused to receive the serving network name of the first user equipment via at least one of the following: an access and mobility management function associated with the first user equipment or an authentication server function associated with the second user equipment.

The network node may implement a unified data management.

The apparatus may comprise the network node, be the network node, or be comprised in the network node.

In a tenth aspect there is provided an apparatus for a first user equipment comprising: at least one processor and at least one memory storing instructions that, when executed by the at least one processor, cause the apparatus at least to: receive an indication of a serving network name of a second user equipment, the second user equipment configured to operate as a relay between the first user equipment and a network by providing a proximity-based service between the first user equipment and the second user equipment and determine an authentication vector for a proximity-based service authentication for the first user equipment based on the serving network name of the second user equipment.

The apparatus may be caused to receive authentication information at the first user equipment, wherein the authentication information comprises the indication of the serving network name of the second user equipment.

The apparatus may further be caused to receive the authentication information in an extensible authentication protocol message.

The apparatus may further comprise the first user equipment, be the first user equipment, or be comprised in the first user equipment.

In an eleventh aspect there is provided an apparatus for a network node, comprising: at least one processor and at least one memory storing instructions that, when executed by the at least one processor, cause the apparatus at least to obtain a serving network name of a first user equipment and determine an authentication vector based on the serving network name of the first user equipment for a proximity-based service authentication for the first user equipment for a proximity-based service between the first user equipment and a second user equipment configured to operate as a relay between the first user equipment and a network.

The apparatus may further be caused to provide an extensible authentication protocol message to the first user equipment, wherein the extensible authentication protocol challenge message comprises the serving network name of the first user equipment.

The serving network name of the first user equipment may be stored at a universal subscriber identity module of the first user equipment.

The apparatus may further be caused to obtain the serving network name of the first user equipment by retrieving it from a storage function.

The network node may implement a unified data management.

The apparatus may comprise the network node, be the network node, or be comprised in the network node.

In a twelfth aspect there is provided an apparatus for a first user equipment, comprising: at least one processor and at least one memory storing instructions that, when executed by the at least one processor, cause the apparatus at least to obtain a serving network name of the first user equipment and determine an authentication vector based on the serving network name of the first user equipment for a proximity-based service authentication for the first user equipment for a proximity-based service between the first user equipment and a second user equipment configured to operate as a relay between the first user equipment and a network.

The apparatus may further be caused to receive authentication information, wherein the authentication information comprises the serving network name of the first user equipment.

The apparatus may further be caused to receive the authentication information in an extensible authentication protocol message.

The apparatus may further be caused to obtain the serving network name of the first user equipment by retrieving it from a universal subscriber identity module associated with the first user equipment.

The apparatus may comprise the first user equipment, be the first user equipment, or be comprised in the first user equipment.

In a thirteenth aspect there is provided a computer readable medium comprising instructions which, when executed by an apparatus, cause the apparatus to perform at least the following: receiving an indication of a serving network name of a first user equipment at a network node, the first user equipment configured to operate as a relay between a second user equipment and a network by providing a proximity-based service between the first user equipment and the second user equipment, determining an authentication vector for a proximity-based service authentication for the second user equipment based on the serving network name of the first user equipment; and providing an indication of the serving network name of the first user equipment to the second user equipment.

The apparatus may be further caused to perform providing authentication information to the second user equipment, wherein the authentication information comprises the indication of the serving network name of the first user equipment.

The apparatus may be further caused to perform providing the authentication information in at least one of the following: a proximity-based service authentication response, a proximity-based service authentication request or an extensible authentication protocol message.

The apparatus may be further caused to perform receiving the serving network name of the first user equipment via at least one of the following: an access and mobility management function associated with the first user equipment or an authentication server function associated with the second user equipment.

The network node may implement a unified data management.

The apparatus may comprise the network node, be the network node, or be comprised in the network node.

In a fourteenth aspect there is provided a computer readable medium comprising instructions which, when executed by an apparatus, cause the apparatus to perform at least the following: receiving at a first user equipment an indication of a serving network name of a second user equipment, the second user equipment configured to operate as a relay between the first user equipment and a network by providing a proximity-based service between the first user equipment and the second user equipment and determining an authentication vector for a proximity-based service authentication for the first user equipment based on the serving network name of the second user equipment.

The apparatus may be further caused to perform receiving authentication information at the first user equipment, wherein the authentication information comprises the indication of the serving network name of the second user equipment.

The apparatus may be further caused to perform receiving the authentication information in an extensible authentication protocol message.

The apparatus may further comprise the first user equipment, be the first user equipment, or be comprised in the first user equipment.

In a fifteenth aspect there is provided a computer readable medium comprising instructions which, when executed by an apparatus, cause the apparatus to perform at least the following: obtaining a serving network name of a first user equipment at a network node and determining an authentication vector based on the serving network name of the first user equipment for a proximity-based service authentication for the first user equipment for a proximity-based service between the first user equipment and a second user equipment configured to operate as a relay between the first user equipment and a network.

The apparatus may be further caused to perform providing an extensible authentication protocol message to the first user equipment, wherein the extensible authentication protocol challenge message comprises the serving network name of the first user equipment.

The serving network name of the first user equipment may be stored at a universal subscriber identity module of the first user equipment.

The apparatus may be further caused to perform obtaining the serving network name of the first user equipment by retrieving it from a storage function.

The network node may implement a unified data management.

The apparatus may comprise the network node, be the network node, or be comprised in the network node.

In a sixteenth aspect there is provided a computer readable medium comprising instructions which, when executed by an apparatus, cause the apparatus to perform at least the following: obtaining a serving network name of a first user equipment at the first user equipment and determining an authentication vector based on the serving network name of the first user equipment for a proximity-based service authentication for the first user equipment for a proximity-based service between the first user equipment and a second user equipment configured to operate as a relay between the first user equipment and a network.

The apparatus may further comprise means for receiving authentication information, wherein the authentication information comprises the serving network name of the first user equipment.

The apparatus may further comprise means for receiving the authentication information in an extensible authentication protocol message.

The apparatus may further comprise means for obtaining the serving network name of the first user equipment by retrieving it from a universal subscriber identity module associated with the first user equipment.

The apparatus may comprise the first user equipment, be the first user equipment, or be comprised in the first user equipment.

In a seventeenth aspect there is provided a non-transitory computer readable medium comprising program instructions for causing an apparatus to perform at least the method according to any of the fifth to eight aspect.

In an eighteenth aspect there is provided a system comprising an apparatus according to the first aspect and an apparatus according to the second aspect.

In a nineteenth aspect there is provided a system comprising an according to the third aspect and an apparatus according to the fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 6 shows a flowchart of a method according to an example embodiment;

FIG. 7 shows a flowchart of a method according to an example embodiment;

FIG. 8 shows a flowchart of a method according to an example embodiment;

FIG. 9 shows a flowchart of a method according to an example embodiment;

FIGS. 10a, 10b and 10c shows a signalling flow according to an example embodiment;

FIGS. 13a, 13b and 13c shows a signalling flow according to an example embodiment.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

The 3GPP has defined a service-based architecture (SBA) for mobile networks, wherein the control plane functionality and common data repositories of a mobile network are provided as a set of interconnected network functions (NFs), each with authorization to access the services of at least some of the other network functions. A network function exposes its functionality via a service-based interface (SBI), which is a well-defined representational state transfer (REST) interface based on for example HTTP/2. Network functions may be operationally connected or linked together to provide services. A network node such as a network element or a generic server may implement one or more network functions. A mobile network may utilise network function virtualization (NFV), in which a network function may be implemented as virtualized network function (VNF) comprising one or more virtual machines running on a virtualization platform. The virtualization platform may comprise one or more virtualization servers, implemented for example using generic type of servers or using customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 1:
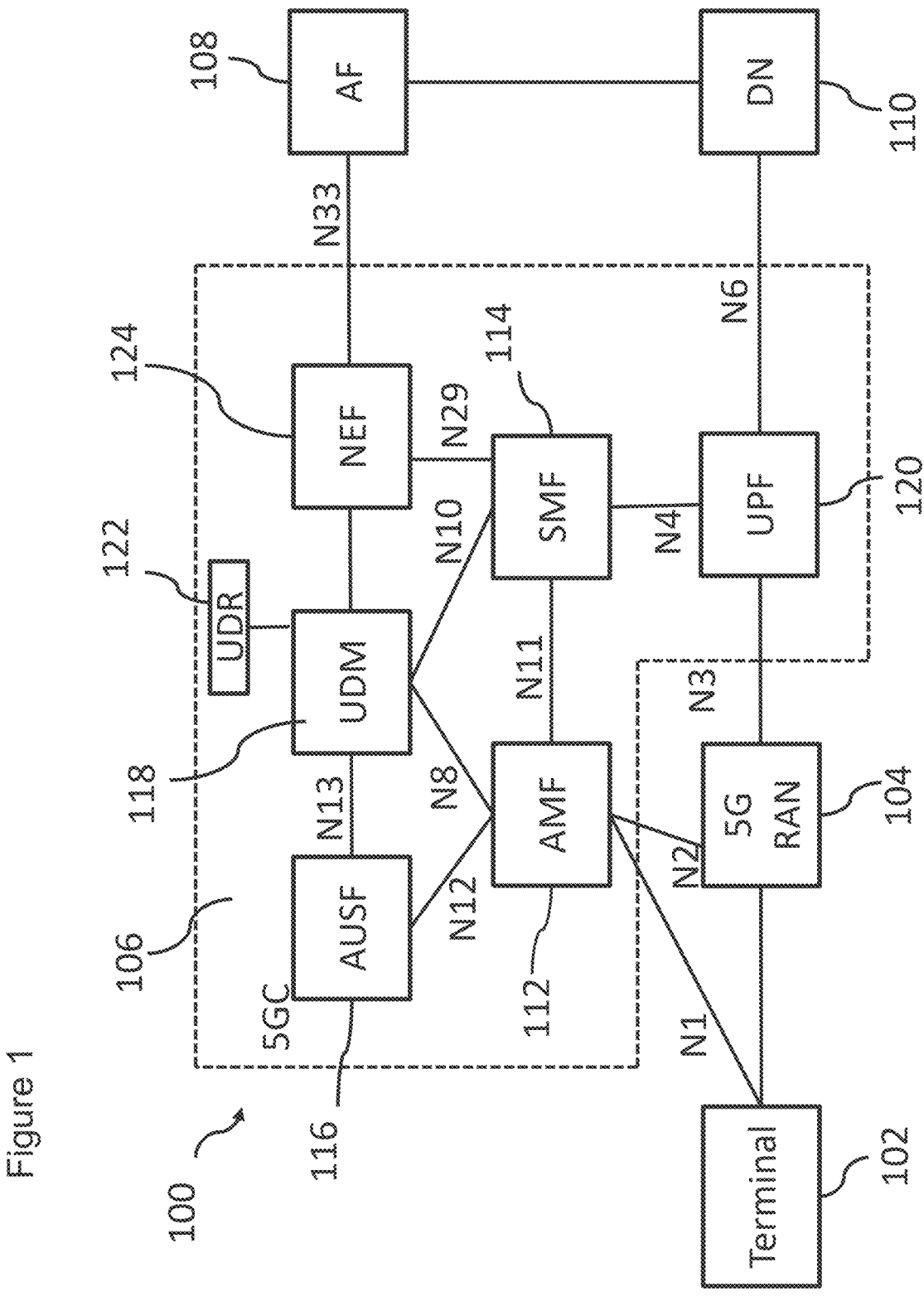
FIG. 1 shows a schematic diagram of an example 5GS communication system.

FIG. 1 shows a schematic representation of a 5G system (5GS) 100. The 5GS may comprise a User Equipment (UE) 102 (which may also be referred to as a communication device or a terminal), a 5G Radio Access Network (5G RAN) 104, a 5G Core Network (5G CN) 106, one or more internal or external Application Functions (AF) 108 and one or more Data Networks (DN) 110.

An example 5G core network (CN) comprises functional entities. The 5G CN 106 may comprise one or more Access and Mobility management Functions (AMF) 112, one or more Session Management Functions (SMF) 114, an Authentication server function (AUSF) 116, a unified data management (UDM) 118, one or more user plane functions (UPF) 120, a unified data repository (UDR) 122 and/or a network exposure function (NEF) 124. The UPF is controlled by the SMF (Session Management Function) that receives policies from a PCF (Policy Control Function).

The CN is connected to a UE via the radio access network (RAN). The 5GRAN may comprise one or more gNodeB (GNB) distributed unit functions connected to one or more gNodeB (GNB) centralized unit functions. The RAN may comprise one or more access nodes. A User Plane Function (UPF) referred to as PDU Session Anchor (PSA) may be responsible for forwarding frames back and forth between the DN and the tunnels established over the 5G towards the UE(s) exchanging traffic with the DN.

Figure 2:
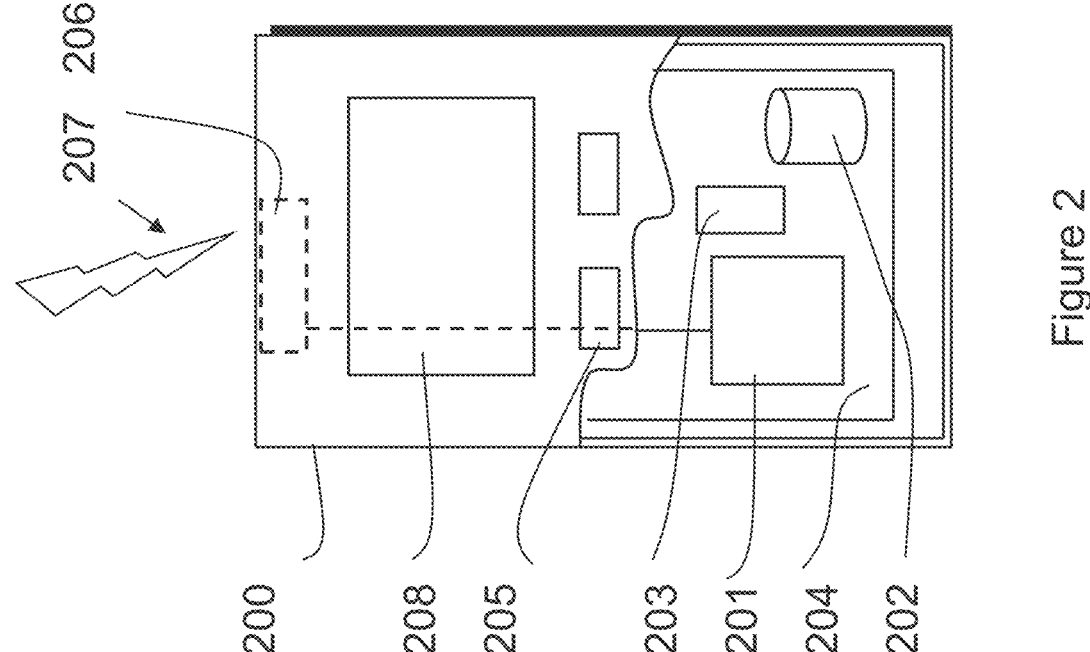
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
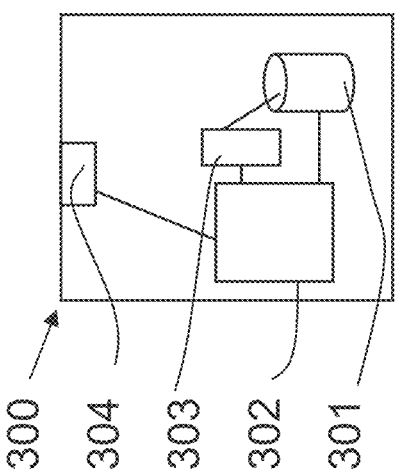
FIG. 3 shows a schematic diagram of an example control apparatus.
Figure 4A:
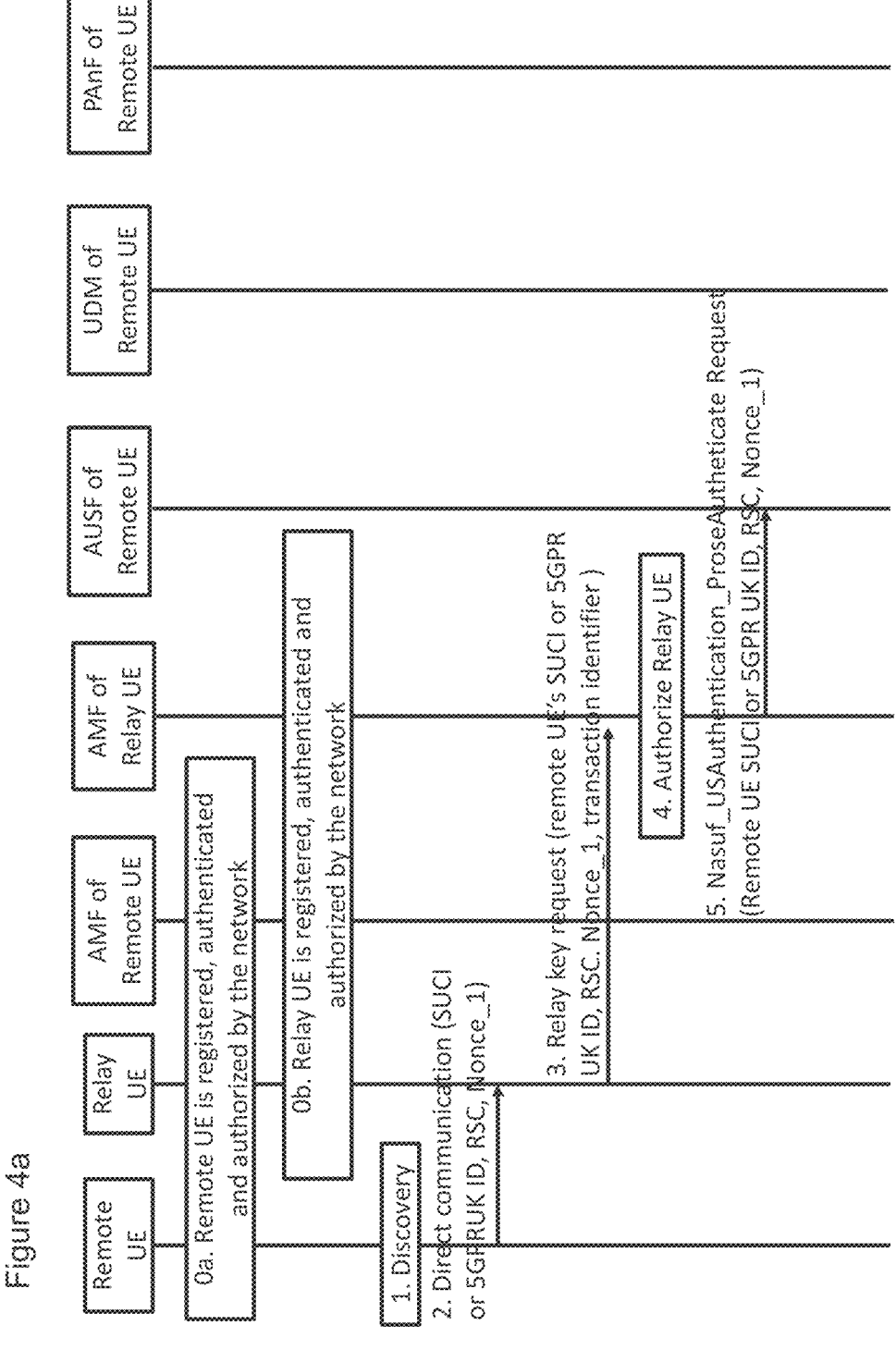
FIGS. 4a, 4b, 4c and 4d shows a signalling flow for a 5G ProSe UE-to-Network Relay security procedure.
Figure 4B:
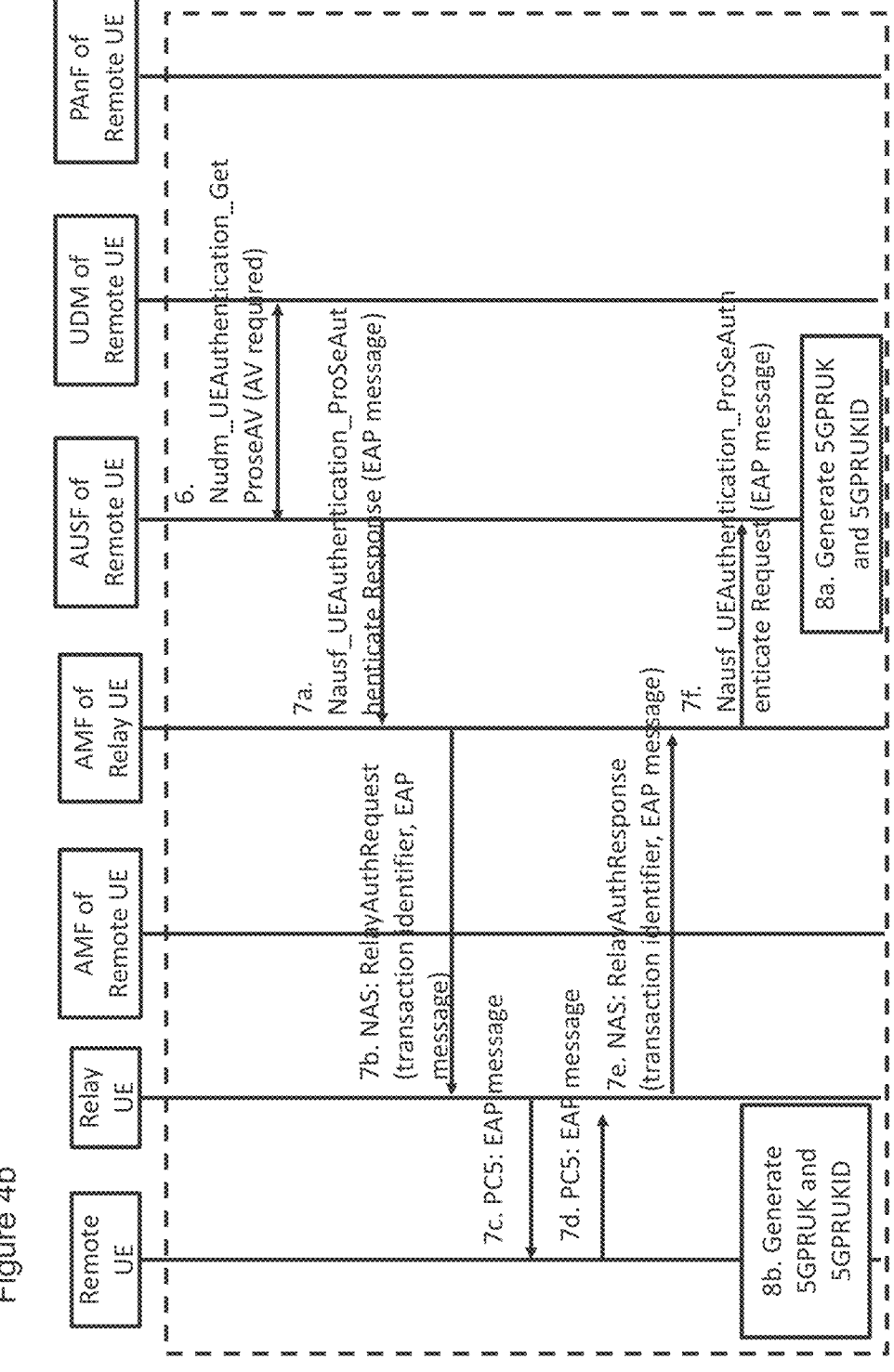
Figure 4C:
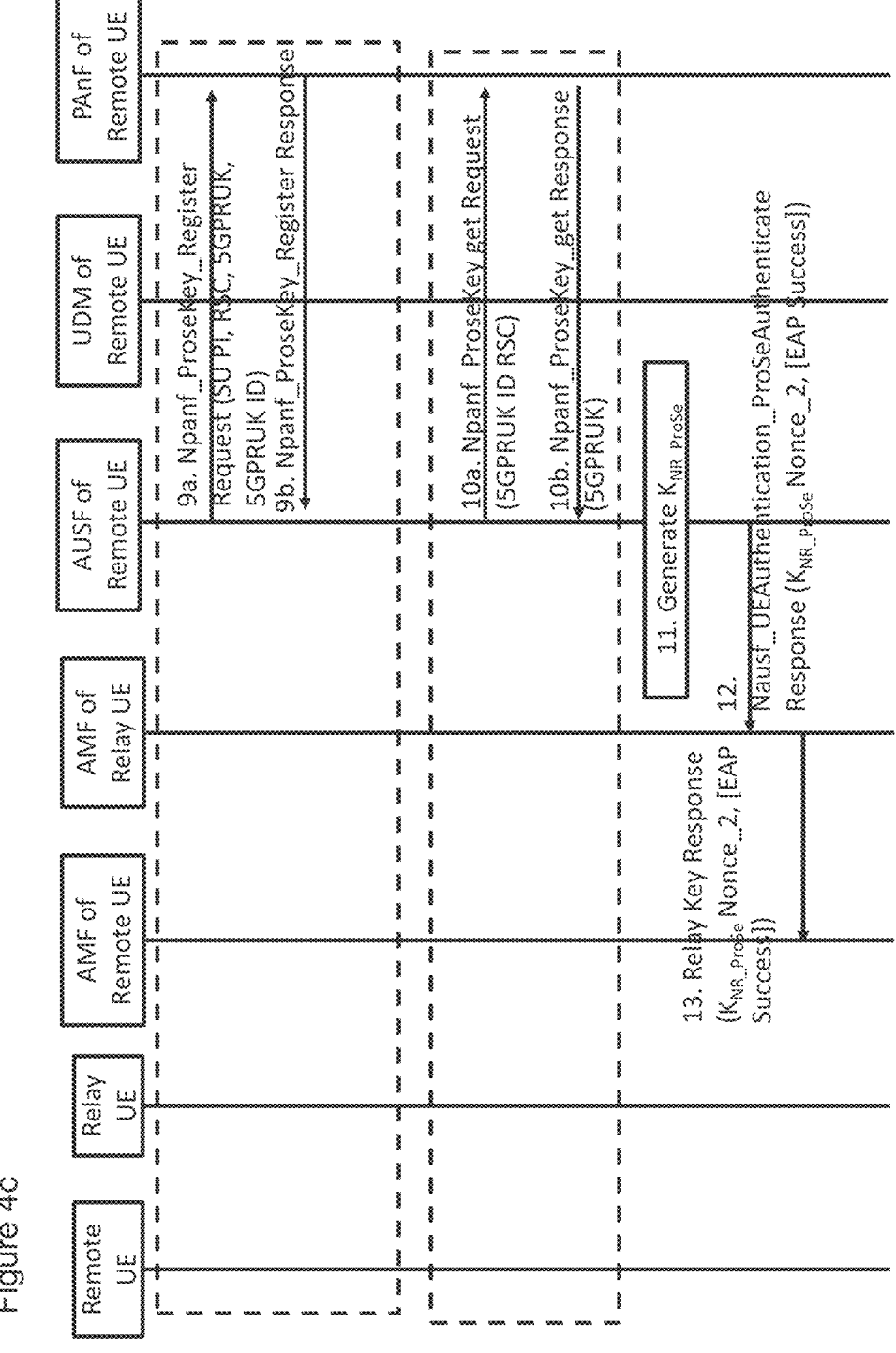
Figure 4D:
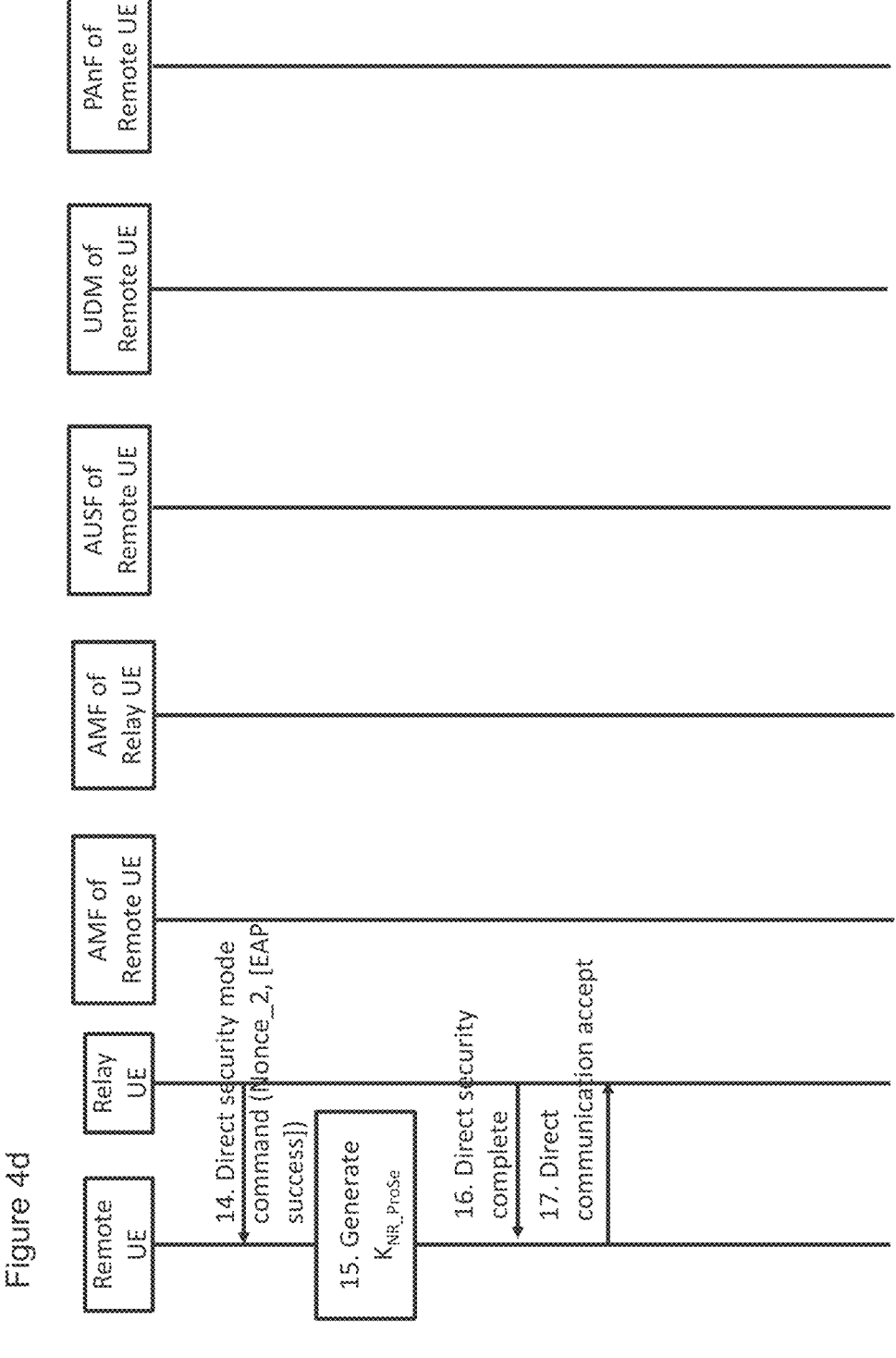

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AUSF, UDM, AMF, SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. The control apparatus 300 may comprise one or more network functions that may be implemented as virtualized network functions. The control apparatus 300 may be a network node. The control apparatus 300 may be a chip and/or a module comprised in a network node.

Security mechanisms for 5G ProSe Layer-3 UE-to-Network Relay authentication, authorization and key management using the 5G ProSe Remote UE specific authentication for PC5 keys establishment have been described. Network functions AMF, AUSF and UDM are involved in key derivation and the distribution of keys used for 5G ProSe UE-to-Network Relay communication. The UE is provisioned with the necessary policies and parameters to use 5G ProSe services as part of UE ProSe Policy information. PCF provisions the authorization policy and parameters for 5G ProSe UE-to-Network Relay discovery.

The procedure for establishing a PC5 link between a 5G ProSe Remote UE and a 5G ProSe UE-to-Network Relay has been described. The procedure includes how the 5G ProSe Remote UE is authenticated by the AUSF of the 5G ProSe Remote UE via the 5G ProSe UE-to-Network Relay and the AMF of the 5G ProSe UE-to-Network Relay during 5G ProSe PC5 establishment. This mechanism can be used when the 5G ProSe Remote UE is out of coverage.

FIG. 4a, 4b, 4c and 4d shows a signalling flow of a 5G ProSe UE-to-Network Relay security procedure with setup of network Prose security context during PC5 link establishment.

At step 0, the 5G ProSe Remote UE and the 5G ProSe UE-to-Network Relay are registered with the network. At 0a, the 5G ProSe Remote UE is authenticated and authorized by the network to receive UE-to-Network Relay service. At 0b, the 5G ProSe UE-to-Network Relay is authenticated and authorized by the network to provide UE-to-Network Relay service. PC5 security policies are provisioned to the 5G ProSe Remote UE and to the 5G ProSe UE-to-Network Relay respectively during this authorization and information provisioning procedure.

At step 1, the 5G ProSe Remote UE initiates a discovery procedure using any of Model A or Model B method.

At step 2, after the discovery of the 5G ProSe UE-to-Network Relay, the 5G ProSe Remote UE sends a Direct Communication Request (DCR) to the 5G ProSe UE-to-Network Relay for establishing secure PC5 unicast link. The 5G ProSe Remote UE includes its security capabilities and PC5 signalling security policy in the DCR message. The message also includes Relay Service Code (RSC), Nonce_1.

If the 5G ProSe Remote UE does not have a valid 5G ProSe Remote User Key (5GPRUK), the 5G ProSe Remote UE shall include SUCI in the DCR to trigger 5G ProSe Remote UE specific authentication and establish a 5GPRUK.

If the 5G ProSe Remote UE already has a valid 5GPRUK, the 5G ProSe Remote UE shall include the 5GPRUK ID in the DCR to indicate that the 5G ProSe Remote UE wants to get relay connectivity using the 5GPRUK.

At step 3, upon receiving the DCR message, the 5G ProSe UE-to-Network Relay sends a Relay Key Request to the AMF of the 5G ProSe UE-to-Network Relay, including the SUCI or 5GPRUK ID, RSC and Nonce_1 received in the DCR message. The 5G ProSe UE-to-Network Relay includes in the message a transaction identifier that identifies the 5G ProSe Remote UE for the subsequent messages over 5G ProSe UE-to-Network Relay's NAS messages.

At step 4, the AMF of the 5G ProSe UE-to-Network Relay verifies whether the 5G ProSe UE-to-Network Relay is authorized to provide the UE-to-Network Relay service.

At step 5, the AMF of the 5G ProSe UE-to-Network Relay selects an AUSF based on SUCI or 5GPRUK ID and forwards the parameters received in the Relay Key Request to the AUSF in a Nausf_UEAuthentication_ProseAuthenticate Request message. The Nausf_UEAuthentication_ProseAuthenticate Request message contains the 5G ProSe Remote UE's SUCI or 5GPRUK ID and Relay Service Code, Nonce_1. If 5GPRUK ID is received from AMF of the 5G ProSe UE-to-Network Relay, the AUSF of the 5G ProSe Remote UE skips steps 6-9. If the 5G ProSe Remote UE's SUCI is received from AMF of the 5G ProSe UE-to-Network Relay, the AUSF of the 5G ProSe Remote UE performs steps 6 to 9 and skips step 10.

At step 6, the AUSF initiates a 5G ProSe Remote UE specific authentication using the ProSe specific parameters received (i.e., RSC, etc.).

The AUSF of the 5G ProSe Remote UE retrieves the Authentication Vectors and the Routing Indicator of the 5G ProSe Remote UE from the UDM via Nudm_UEAuthentication_GetProseAv Request message. Upon reception of the Nudm_UEAuthentication_GetProSeAv Request, the UDM invokes SIDF de-conceal SUCI to gain SUPI before UDM can process the request. The UDM checks whether the UE is authorized to use a ProSe UE-to-Network Relay service based on authorization information in UE's Subscription data. If the UE is authorized, the UDM shall choose the authentication method based on SUPI.

At step 7a, if EAP-AKA' is selected by UDM, the AUSF of the 5G ProSe Remote UE triggers authentication of the 5G ProSe Remote UE based on EAP-AKA'. The AUSF of the 5G ProSe Remote UE generates an EAP-Request/AKA'-Challenge and sends EAP-Request/AKA'-Challenge message to the AMF of the 5G ProSe UE-to-Network Relay in a Nausf_UEAuthentication_ProSeAuthenticate Response message.

At step 7b, the AMF of the 5G ProSe UE-to-Network Relay forwards the Relay Authentication Request (including the EAP-Request/AKA'-Challenge) to the 5G ProSe UE-to-Network Relay over NAS message, including transaction identifier of the 5G ProSe Remote UE in the message. The NAS message is protected using the NAS security context created for the 5G ProSe UE-to-Network Relay.

At step 7c, based on the transaction identifier, the 5G ProSe UE-to-Network Relay shall forward the EAP-Request/AKA'-Challenge to the 5G ProSe Remote UE over PC5 messages.

The Universal Subscriber Identity Module (USIM) in the 5G ProSe Remote UE verifies the freshness of the received values by checking whether AUTN can be accepted.

For EAP-AKA', the USIM computes a response RES. The USIM shall return RES, CK, IK to the ME. The ME shall derive CK' and IK'.

At step 7d, the 5G ProSe Remote UE returns a EAP-Response/AKA'-Challenge to the 5G ProSe UE-to-Network Relay over PC5 messages.

At step 7e, the 5G ProSe UE-to-Network Relay forwards the EAP-Response/AKA'-Challenge together with the transaction identifier of the 5G ProSe Remote UE to the AMF of the 5G ProSe UE-to-Network Relay in a NAS message Relay Authentication Response.

At step 7f, the AMF of the 5G ProSe UE-to-Network Relay forwards EAP-Response/AKA'-Challenge to the AUSF of the 5G ProSe Remote UE via Nausf_UEAuthentication_ProSeAuthenticate Request.

The AUSF of the 5G ProSe Remote UE performs the UE authentication by verifying the received information.

For EAP-AKA', the AUSF of the 5G ProSe Remote UE and the 5G ProSe Remote UE may exchange EAP-Request/AKA'-Notification and EAP-Response/AKA'-Notification messages via the AMF of the 5G ProSe UE-to-Network Relay and the 5G ProSe UE-to-Network Relay.

After the exchanges, the AUSF of the 5G ProSe Remote UE and the 5G ProSe Remote UE shall derive the KAUSF_P in the same way as KAUSF is derived.

At step 8, on successful authentication, the AUSF of the 5G ProSe Remote UE and the 5G ProSe Remote UE shall generate 5GPRUK.

The 5GPRUK ID is in NAI format, i.e. username@realm. The username part includes the Routing Indicator from step 6 and the 5GPRUK ID*, and the realm part includes Home Network Identifier.

At step 9a, the AUSF of the 5G ProSe Remote UE shall select the PAnF (Prose Anchor Function) based on 5GPRUK ID and send the SUPI, RSC, 5GPRUK and 5GPRUK ID in Npanf_ProseKey_Register Request message to the PAnF.

At step 9b, the PAnF shall store the Prose context info (i.e. SUPI, RSC, 5GPRUK, 5GPRUK ID) for the 5G ProSe Remote UE and send Npanf_ProseKey_Register Response message to the AUSF.

In step 10a, the AUSF of the 5G ProSe Remote UE shall select the PAnF based on 5GPRUK ID and send received 5GPRUK ID and RSC in Npanf_ProseKey_get Request message.

At step 10b, the PAnF retrieves 5GPRUK based on the 5GPRUK ID and checks whether the 5G ProSe Remote UE is authorized to use the UE-to-Network Relay service based on received RSC. If the 5G ProSe Remote UE is authorized and the retrieved 5GPRUK is valid, the PAnF sends Npanf_ProseKey_get Response message with 5GPRUK to the AUSF.

At step 11, the AUSF of the 5G ProSe Remote UE generates Nonce_2 and derives the KNR_ProSe key using 5GPRUK, Nonce_1 and Nonce_2.

At step 12, the AUSF of the 5G ProSe Remote UE sends the KNR_ProSe, Nonce_2 in Nausf_UEAuthentication_ProseAuthenticate Response message to the 5G ProSe UE-to-Network Relay via the AMF of the 5G ProSe UE-to-Network Relay. EAP Success message shall be included if step 7 is performed successfully. The AUSF of the 5G ProSe Remote UE shall also include the 5GPRUK ID in the message if generated in step 8.

At step 13, when receiving a KNR_ProSe from the AUSF of the 5G ProSe Remote UE via the AMF of the 5G ProSe UE-to-Network Relay, the 5G ProSe UE-to-Network Relay derives PC5 session key Krelay-sess and confidentiality key Krelay-enc (if applicable) and integrity key Krelay-int from KNR_ProSe. KNR_ProSe ID and Krelay-sess ID are established in the same way as KNRP ID and KNRP-sess ID. The EAP Success message and 5GPRUK ID are also sent from the AMF of the 5G ProSe UE-to-Network Relay to UE-to-Network Relay if received from AUSF.

At step 14, the 5G ProSe UE-to-Network Relay sends the received Nonce_2 and 5G ProSe Remote UE's PC5 signalling security policy to the 5G ProSe Remote UE in Direct Security mode command message, which is integrity protected using Krelay-int. EAP Success message shall be included if received from the AMF of the 5G ProSe UE-to-Network Relay.

At step 15, the 5G ProSe Remote UE generates the KNR_ProSe key to be used for remote access via the 5G ProSe UE-to-Network Relay in the same way as defined in step 11. The 5G ProSe Remote UE shall derive PC5 session key Krelay-sess and confidentiality and integrity keys from KNR_ProSe in the same way as defined in step 13.

At step 16, the 5G ProSe Remote UE sends a Direct Security Mode Complete message containing its PC5 user plane security policies to the 5G ProSe UE-to-Network relay, which is protected by Krelay-int or/and Krelay-enc derived from Krelay-sess according to the negotiated PC5 signalling policies between the 5G ProSe Remote UE and the 5G ProSe UE-to-Network Relay.

At step 17, after the successful verification of the Direct Security Mode complete message, the 5G ProSe UE-to-Network Relay receives a Direct Communication Accept message to the 5G ProSe Remote UE to finish the PC5 connection establishment procedures and store the 5GPRUK ID in the security context associated to the PC5 link with the 5G ProSe Remote UE.

A serving network name (SNN) is the concatenation of a service code and the SN Id with a separation character ":" such that the service code prepends the SN Id. A serving network name (SNN) is used in the derivation of the anchor key. The SNN serves a dual purpose, namely binding the anchor key to the serving network by including the serving network identifier (SN Id) and making sure that the anchor key is specific for authentication between a 5G core network and a UE by including a service code set to "5G".

In 5G AKA, the serving network name has a similar purpose of binding the RES* and XRES* to the serving network.

No parameter like 'access network type' is used for serving network name as it relates to a 5G core procedure that is access network agnostic. The SN Id identifies the serving PLMN and, except for standalone non-public networks, is defined as SNN-network-identifier.

A UE constructs a SNN as follows. The UE sets the service code to "5G", sets the network identifier to the SN Id of the network that it is authenticating to and concatenates the service code and the SN Id with the separation character ":".

A SEAF constructs the serving network name as follows. The SEAF sets the service code to "5G", sets the network identifier to the SN Id of the serving network to which the authentication data is sent by the AUSF and concatenates the service code and the SN Id with the separation character ":".

The AUSF gets the serving network name from the SEAF. Before using the serving network name, AUSF checks that the SEAF is authorized to use it.

A ProseAuthenticate service operation may be used to authenticate the 5G ProSe Remote UE in AUSF, for example in step 0a of FIG. 4a, 4b, 4c and 4d.

Figure 5:
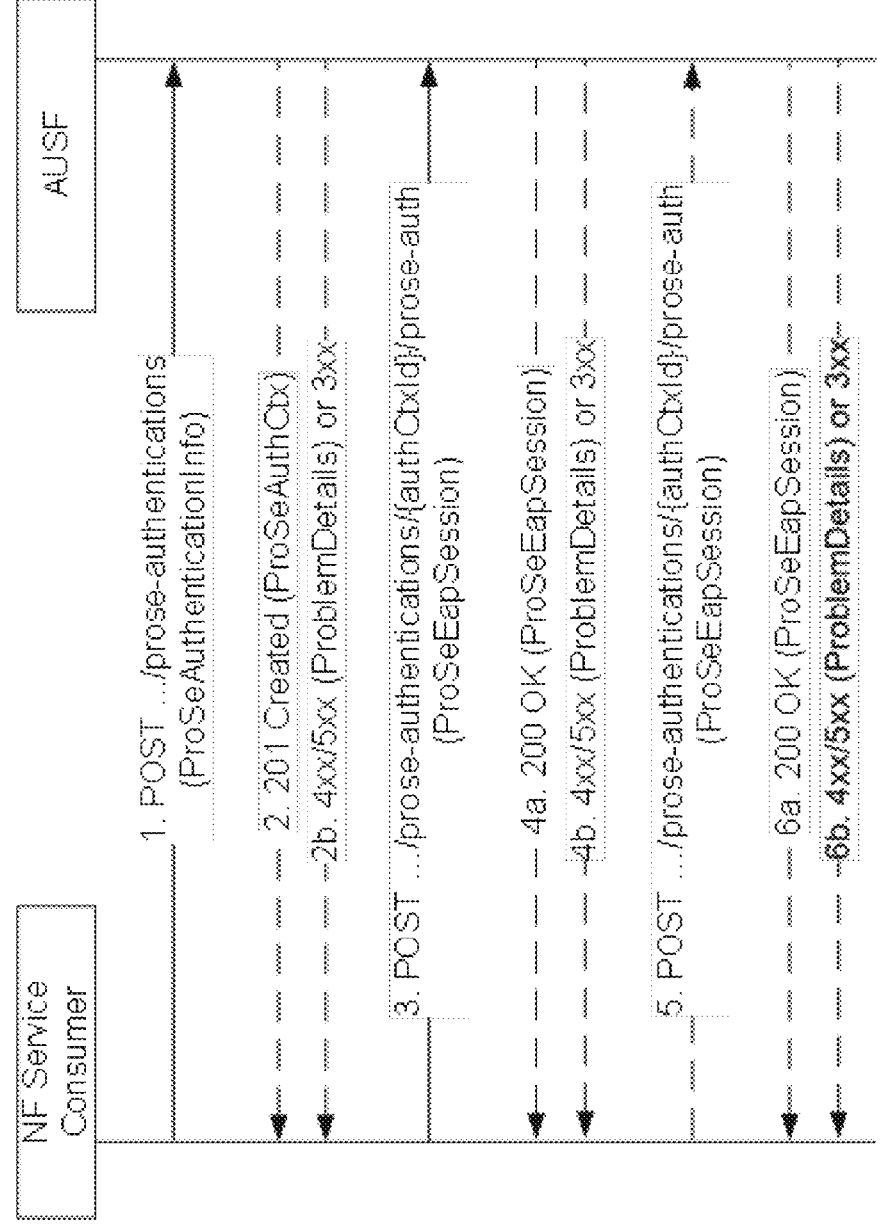
FIG. 5 shows a signalling flow for ProSe authentication.

The NF Service Consumer (AMF) requests the authentication of the 5G ProSe Remote UE by providing 5G ProSe Remote UE related information, the Relay Service Code and Nonce_1 to the NF Service Producer (AUSF), which retrieves 5G ProSe Remote UE related data and authentication method from the UDM. In the example shown in FIG. 5, the retrieved authentication method is EAP-AKA. The NF Service Consumer (AMF) then returns to the AUSF the result received from the 5G ProSe Remote UE.

At step 1, the NF Service Consumer (AMF) sends a POST request to the AUSF. The payload of the body shall contain the UE Id, Relay Service Code and Nonce_1.

At step 2a, on success, "201 Created" shall be returned. The payload body shall contain the representation of the resource generated and the "Location" header shall contain the URI of the generated resource (e.g. . . . /v1/prose_authentications/{authCtxId}). The AUSF generates a sub-resource "prose-auth". There shall be only one sub-resource

|

"prose-auth" per UE identified by the supiOrSuci in ProSe-AuthenticationInfo. The AUSF shall provide a hypermedia link towards this sub-resource in the payload to indicate to the AMF where it shall send a POST containing the EAP packet response. The body payload shall also contain the EAP packet EAP-Request/AKA'-Challenge.

Alternatively, at step 2b, on failure or redirection, one of the HTTP status codes listed in Table 1 shall be returned. For a 4xx/5xx response, the message body may contain a ProblemDetails structure with the "cause" attribute set to one of the application errors listed in Table 1.

At step 3, based on the relation type, the NF Service Consumer (AMF) sends a POST request including the EAP-Response/AKA' Challenge received from the 5G ProSe Remote UE. The POST request is sent to the URI provided by the AUSF or derived by the NF Service Consumer (AMF).

Steps 4 to 5 are optional.

At step 4a, on success, and if the AUSF and the UE have indicated the use of protected successful result indications, the AUSF shall reply with a "200 OK" HTTP message containing the EAP Request/AKA' Notification and a hypermedia link towards the sub-resource "prose-auth".

Alternatively, at 4b, on failure or redirection, one of the HTTP status codes listed in Table 1 shall be returned. For a 4xx/5xx response, the message body may contain a ProblemDetails structure with the "cause" attribute set to one of the application errors listed in Table 1.

payload shall contain the result of the authentication, an EAP success/failure and the KNR_ProSe if the authentication is successful. If the 5G ProSe Remote UE is not authenticated, the AUSF shall set the authResult to AUTHENTICATION_FAILURE.

At step 6b, on failure or redirection, one of the HTTP status codes listed in Table 1 shall be returned. For a 4xx/5xx response, the message body may contain a ProblemDetails structure with the "cause" attribute set to one of the application errors listed in Table 1.

TABLE 2

| Attribute name | Data type | P | Cardinality | Description |
|---|---|---|---|---|
| supiOrSuci | SupiOrSuci | M | 1 | Contains the SUPI or SUCI of the UE. |
| relayServiceCode | RelayServiceCode | M | 1 | Indicates Relay Service Code. See 3GPP TS 29.571 [7] clause 5.4.2 |
| nonce1 | Nonce1 | M | 1 | Indicates Nonce 1. |
| supportedFeatures | SupportedFeatures | C | 0 . . . 1 | This IE shall be present if at least one optional feature defined in clause 6.1.9 is supported. |

Table 2 shows a definition of ProSeAuthenticationInfo.

An operation is used by the NF service consumer (AUSF) to request ProSe authentication vector(s) for the 5G ProSe

TABLE 1

| Data type | P | Cardinality | Response Codes | Description |
|---|---|---|---|---|
| EapSession | M | 1 | 200 OK | During an EAP session, the body response shall contain the EAP packet Response and a hypermedia link. At the end of the EAP session, the body response shall contain the EAP packet Success or Failure (see IETF RFC 3748 [18]) and the Kseaf if the authentication is successful |
| RedirectResponse | O | 0 . . . 1 | 307 Temporary Redirect | Temporary redirection. The response shall include a Location header field containing a different URI, or the same URI if a request is redirected to the same target resource via a different SCP. In the former case, the URI shall be an alternative URI of the resource located on an alternative service instance within the same AUSF or AUSF (service) set. (NOTE 2) |
| RedirectResponse | O | 0 . . . 1 | 308 Permanent Redirect | Permanent redirection. The response shall include a Location header field containing a different URI, or the same URI if a request is redirected to the same target resource via a different SCP. In the former case, the URI shall be an alternative URI of the resource located on an alternative service instance within the same AUSF or AUSF (service) set. (NOTE 2) |
| ProblemDetails | O | 0 . . . 1 | 400 Bad Request | This case represents an EAP session failure because of input parameter error. This indicates that the AUSF was not able to continue the EAP session. |
| ProblemDetails | O | 0 . . . 1 | 500 Internal Server Error | This case represents an EAP session failure because of a server internal error. |

At step 5, the NF Service Consumer (AMF) shall send a POST request including the EAP Response/AKA' Notification received from the UE. The POST request is sent to the URI provided by the AUSF or derived by the NF Service Consumer (AMF).

At step 6a, if the ProSe authentication exchange is successfully completed (with or without the optional Notification Request/Response messages exchange), "200 OK" shall be returned to the NF Service Consumer (AMF). The Remote UE from the UDM. If SUCI is provided, the UDM calculates the SUPI from the SUCI. The UDM calculates an authentication vector taking into account the information received from the NF service consumer (AUSF) and the current representation of this resource if EAP-AKA' is selected. This operation shall support the request data structures specified in Table 3 below. The ProSeAuthenticationInfoRequest is as shown in Table 4.

TABLE 3

| Data type | P | Cardi-nality | Description |
|---|---|---|---|
| ProSeAuthentica-tionInfoRequest | M | 1 | Contains the relay service code and, optionally, resynchronization info. |

TABLE 4

| Attribute name | Data type | P | Cardinality | Description |
|---|---|---|---|---|
| servingNetworkName | ServingNetworkName | M | 1 | See 3GPP TS 33.501 [6] clause 6.1.1.4 |
| relayServiceCode | RelayServiceCode | M | 1 | Indicates Relay Service Code. See 3GPP TS 29.571 [7] clause 5.4.2 |
| resynchronizationInfo | ResynchronizationInfo | O | 0 . . . 1 | Contains RAND and AUTS. |
| supportedFeatures | SupportedFeatures | O | 0 . . . 1 | See clause 6.3.8 |

It is not clear which SNN is to be used by the UDM for Authentication vector generation. The SNN may be the remote UE's SNN or the relay UE's SNN.

If the remote UE's SNN is used, the AUSF of the remote UE in a ProSe direct communication procedure should be aware of the SNN, and it should be sent from the AUSF to the UDM of the remote UE.

If the relay UE's SNN is used, there is no SNN information element in ProseAuthenticate from the AMF of the relay UE to the AUSF of the remote UE and so the AUSF of the remote UE is unaware of the information.

If relay UE's SNN is used for AV generation, and EAP-AKA' is used for ProSe specific authentication, the USIM of the remote UE and UDM use the same SNN for authentication vector generation because it is shared in AKA challenge message in EAP message.

However, this approach is not suitable when 5G AKA is used for ProSe authentication. With 5G AKA the remote UE USIM and UDM use the SNN independently without network sharing it in AKA challenge message.

FIG. 6 shows a flowchart of a method according to an example embodiment. The method may be performed at a network node such as a UDM.

In S1, the method comprises receiving an indication of a serving network name of a first user equipment at a network node, the first user equipment configured to operate as a relay between a second user equipment and a network by providing a proximity-based service between the first user equipment and the second user equipment.

In S2, the method comprises determining an authentication vector for a proximity-based service authentication for the second user equipment based on the serving network name of the first user equipment.

In S3, the method comprises providing an indication of the serving network name of the first user equipment to the second user equipment.

In the method described with reference to FIG. 6, the first user equipment may be referred to as a relay UE and the second user equipment may be referred to as a remote UE.

FIG. 7 shows a flowchart of a method according to an example embodiment. The method may be performed at a UE.

In T1, the method comprises receiving an indication of a serving network name of a second user equipment at a first user equipment, the second user equipment configured to operate as a relay between the first user equipment and a network by providing a proximity-based service between the first user equipment and the second user equipment.

In T2, the method comprises determining an authentication vector for a proximity-based service authentication for the first user equipment based on the serving network name of the second user equipment.

In the method described with reference to FIG. 7, the first user equipment may be referred to as a remote UE and the second user equipment may be referred to as a relay UE.

FIG. 8 shows a flowchart of a method according to an example embodiment. The method may be performed at a network function such as a UDM.

In R1, the method comprises obtaining a serving network name of a first user equipment at a network node.

In R2, the method comprises determining an authentication vector based on the serving network name of the first user equipment for a proximity-based service authentication for the first user equipment for a proximity-based service between the first user equipment and a second user equipment configured to operate as a relay between the first user equipment and a network.

FIG. 9 shows a flowchart of a method according to an example embodiment. The method may be performed at a UE.

In U1, the method comprises obtaining a serving network name of a first user equipment at the first user equipment.

In U2, the method comprises determining an authentication vector based on the serving network name of the first user equipment for a proximity-based service authentication for the first user equipment for a proximity-based service between the first user equipment and a second user equipment configured to operate as a relay between the first user equipment and a network.

In the methods described with reference to FIGS. 8 and 9, the first user equipment may be referred to as a remote UE and the second user equipment may be referred to as a relay UE.

The proximity-based service authentication may be EAP AKA' or 5G AKA or any other suitable proximity-based service authentication procedure.

In an example first approach, such as that shown in FIGS. 8 and 9, for EAP AKA' or 5G AKA, the AMF of a relay UE does not share the SNN with AUSF and the AUSF does not share the relay UE SNN to UDM. Instead, UDM obtains the remote UE SNN for authentication vector generation. Obtaining the serving network name of the first user equipment may comprise retrieving the serving network name of the first user equipment from a storage function.

A method as described with reference to FIG. 9 may comprise receiving authentication information at the first user equipment, wherein the authentication information comprises the serving network name of the first user equipment. The authentication information may comprise an Extensible Authentication Protocol (EAP) message. The method according to FIG. 8 may comprise providing an EAP message to the first user equipment, wherein the EAP message comprises the serving network name of the first user equipment.

For example, in the first approach, when EAP AKA' is used, the UDM may share the remote UE SNN to the remote UE in an Authentication and Key Agreement (AKA) challenge message.

Alternatively, the serving network name of the first user equipment may be stored at a USIM of the first user equipment. Obtaining the serving network name of the first user equipment at the first user equipment may comprise retrieving the serving network name of the first user equipment from a universal subscriber identity module associated with the first user equipment.

For example, when 5G AKA is used, the UDM and remote UE uses the SNN stored from previous procedures (last registered AMF), which is "Remote UE SNN". The UDM and the remote UE retrieve the SNN from memory/storage (e.g., USIM in the UE's case) and use it to generate the authentication vector.

A method as described with reference to FIG. 6 may comprise receiving the serving network name from the first user equipment via at least one of the following: an AMF associated with the first user equipment or an AUSF associated with the first user equipment.

In an example second approach, such as that shown in FIG. 6 for EAP AKA' or 5G AKA, the AMF of the relay UE sends the relay UE SNN to the AUSF and then to the UDM. The SNN of the relay UE is then used in Authentication vector generation.

A method according to FIG. 6 may comprise providing authentication information to the second user equipment, wherein the authentication information comprises the indication of the serving network name of the first user equipment. Authentication information may be provided in at least one of the following: a proximity-based service authentication response, a proximity-based service authentication request or an EAP message.

Figure 10B:
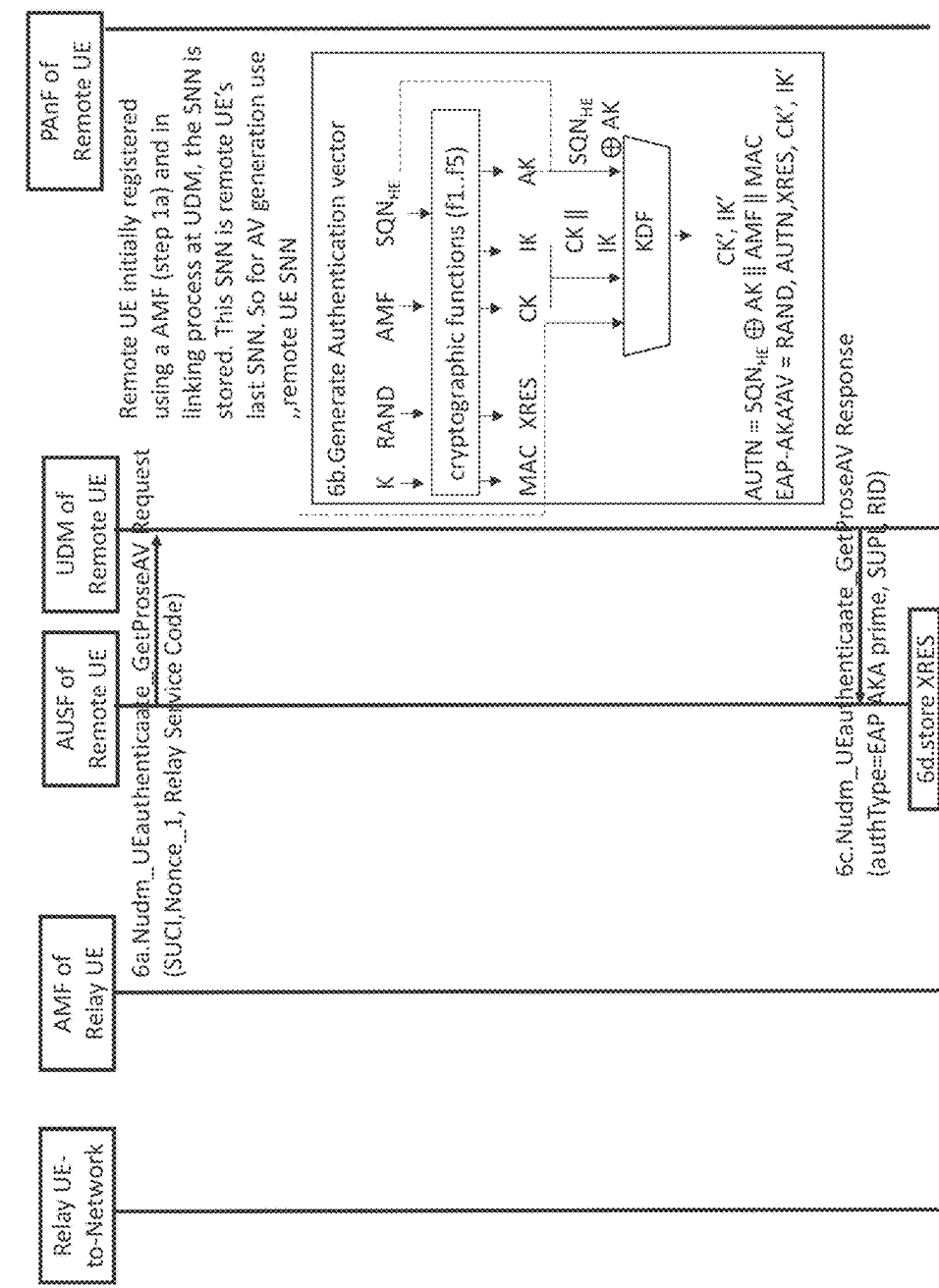
Figure 10C:
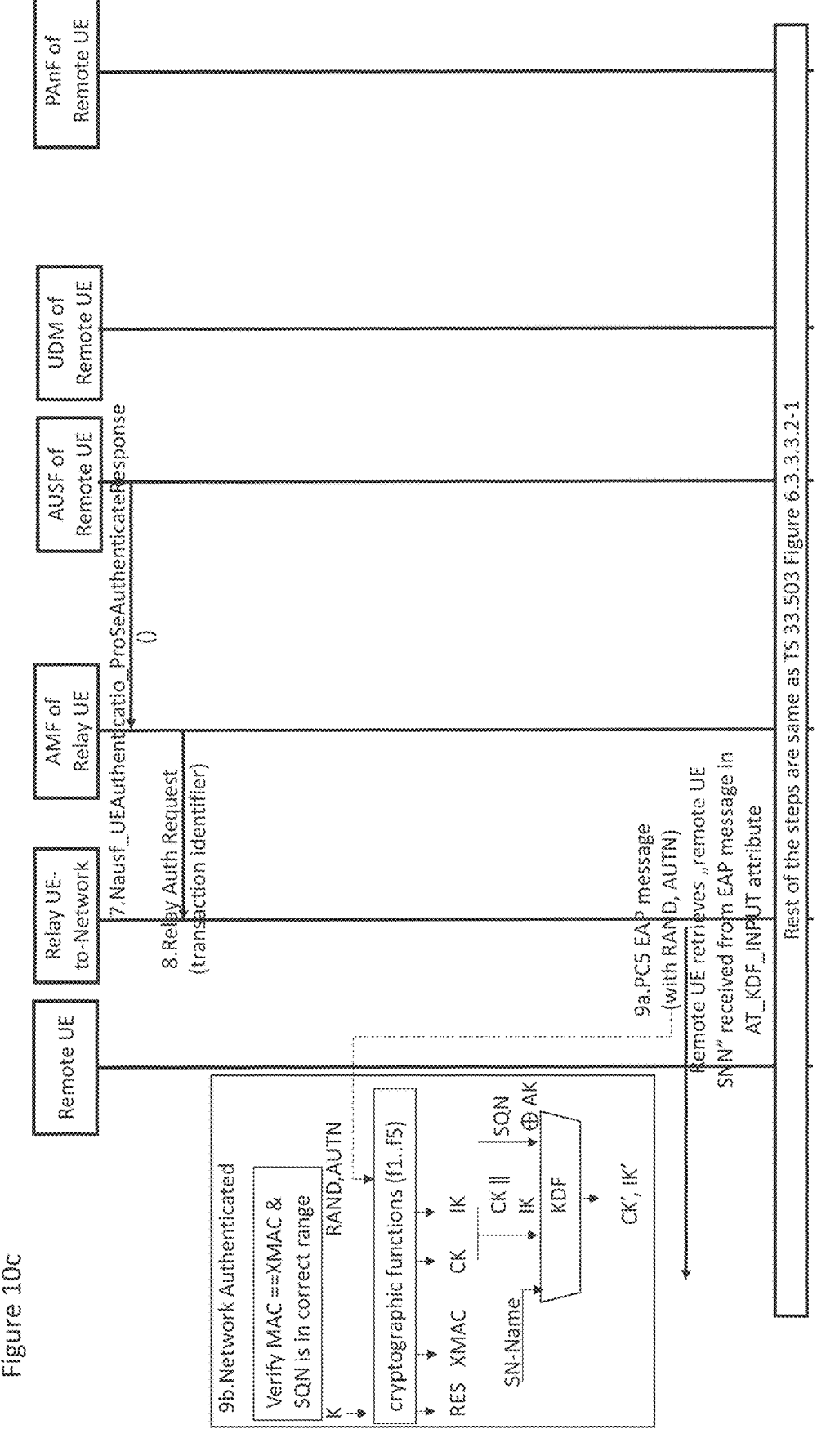

FIG. 10a, 10b and 10c shows an example signalling flow for ProSe EAP AKA' authentication according to the first approach. The AMF of a relay UE doesn't share the SNN to AUSF and the AUSF also doesn't share SNN to UDM.

Figure 11A:
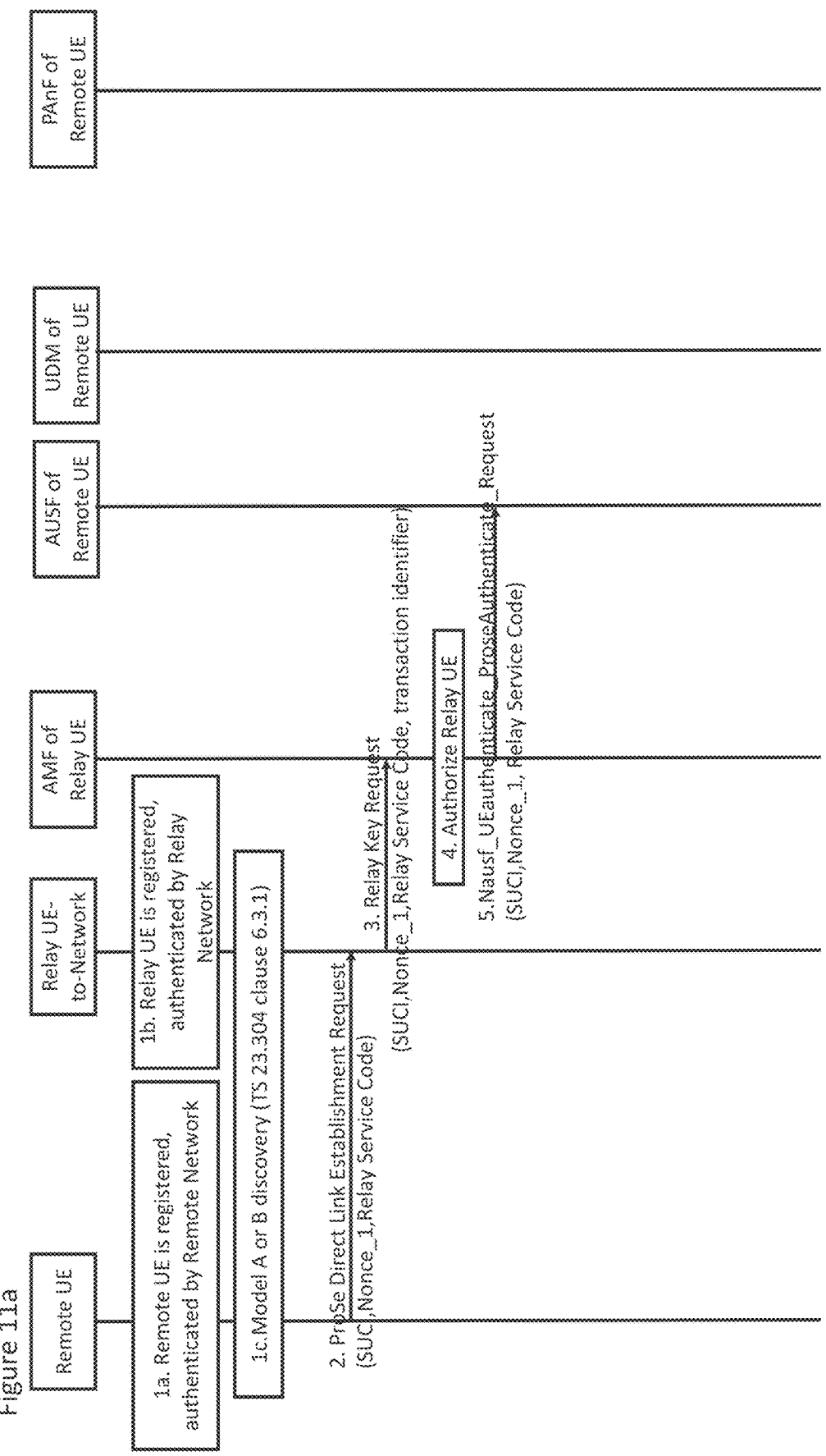
FIGS. 11a, 11b and 11c shows a signalling flow according to an example embodiment.
Figure 11B:
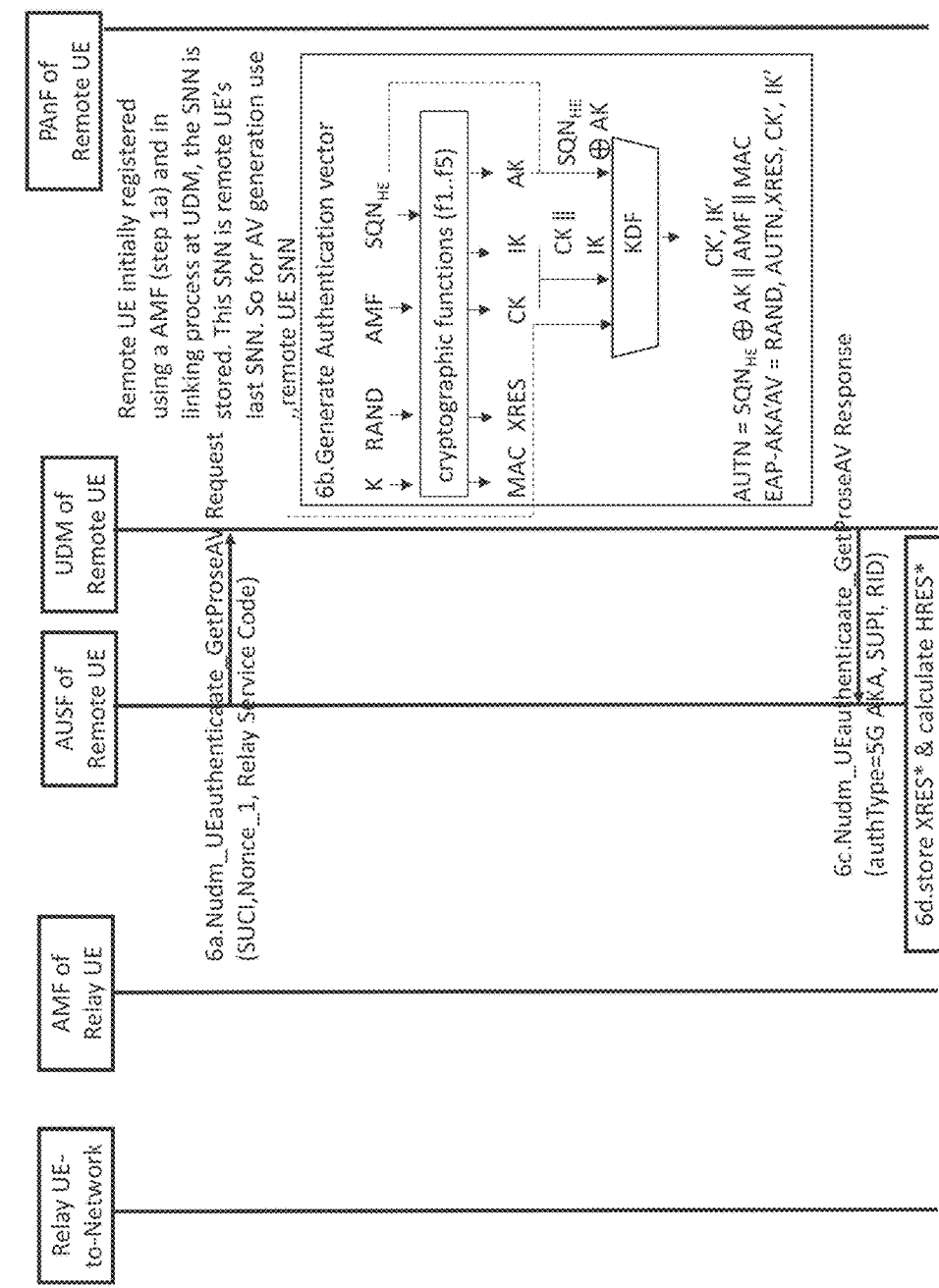
Figure 11C:
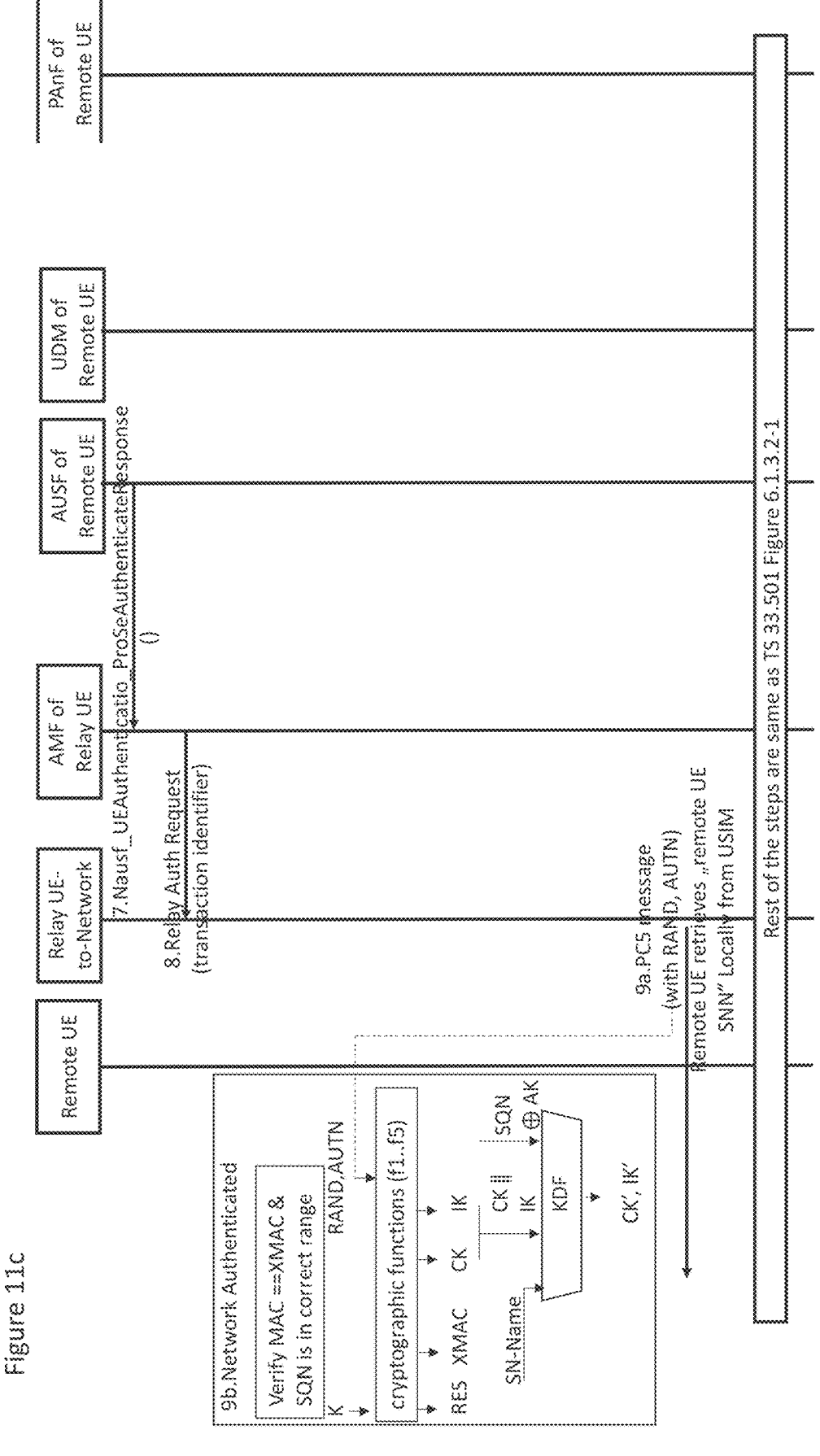

FIG. 11a, 11b and 11c shows an example signalling flow for ProSe 5G AKA authentication according to the first approach. The AMF of relay UE doesn't share the SNN to AUSF and the AUSF doesn't share SNN to UDM.

At Step 1a of FIGS. 10a and 11a, when the remote UE is registered and authenticated by the network, the UDM will store the results and time of authentication procedure. This includes the SUPI, a timestamp of the authentication, the authentication type (e.g. EAP method or 5G-AKA), and the serving network name (referred to as Remote UE SNN).

In FIG. 10a, 10b and 10c, when the remote UE via relay UE-to-network triggers a ProSe specific authentication request and when the request reaches UDM, after the de-concealment of SUCI, the Remote UE SNN is retrieved from UDM storage and used for ProSe Authentication vector generation.

The same "Remote UE SNN" is used in AT_KDF_INPUT and passed to remote UE/USIM in EAP AKA challenge for ProSe specific authentication.

In case of 5G AKA, UDM retrieves SNN from stored memory and the remote UE retrieves SNN from USIM. There is no exchange of remote UE SNN info in the case 5G AKA for messages from 6c to 9a of FIG. 11a, 11b and 11c.

In FIG. 11a, 11b and 11c, when Remote UE via relay UE-to-network triggers the ProSe specific authentication request and when it reaches UDM, after the de-concealment of SUCI, the "Remote UE SNN" from UDM storage is retrieved and used for ProSe specific Authentication vector generation.

Figure 12A:
FIGS. 12a, 12b and 12c shows a signalling flow according to an example embodiment.
Figure 12B:
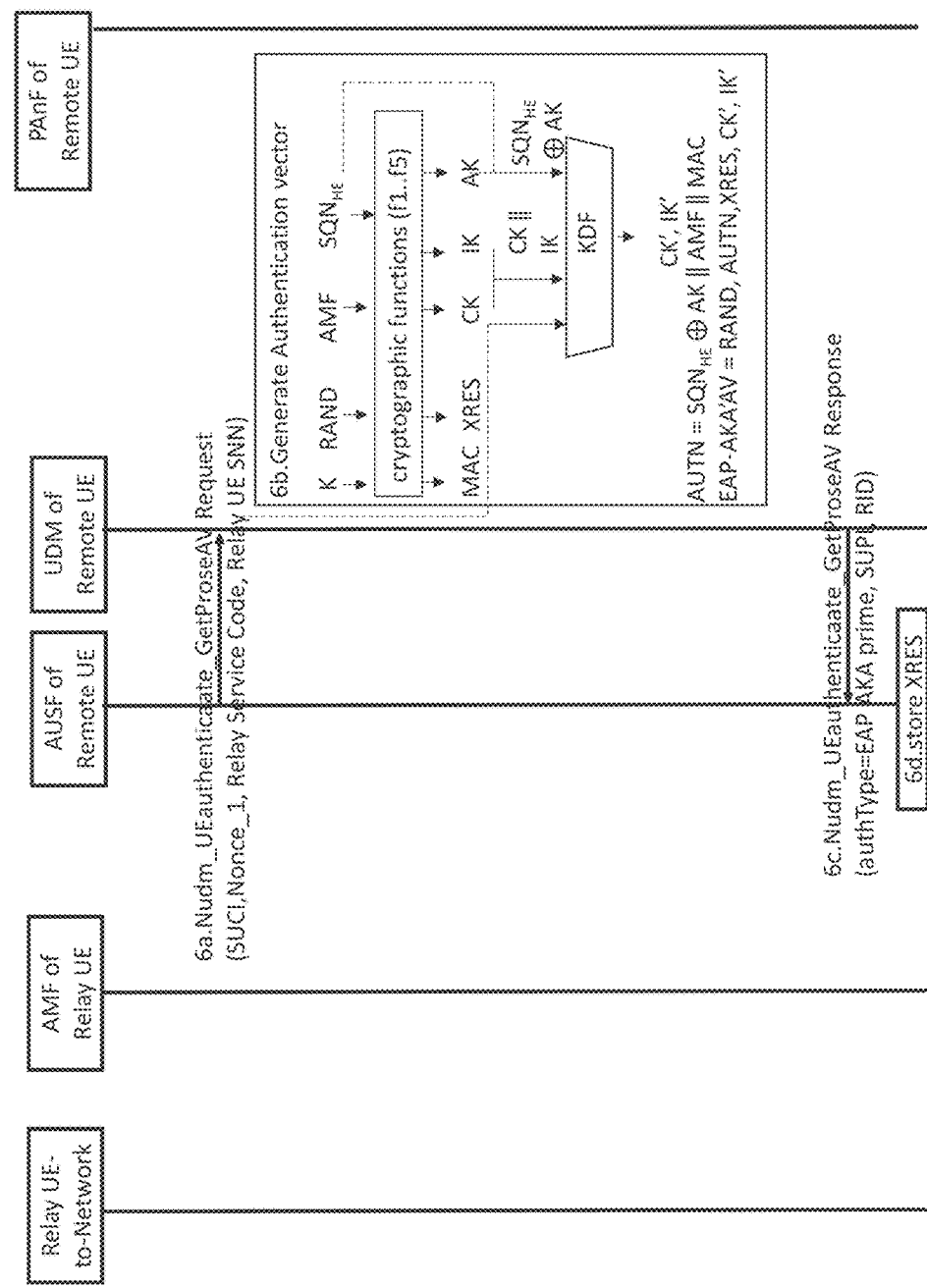
Figure 12C:
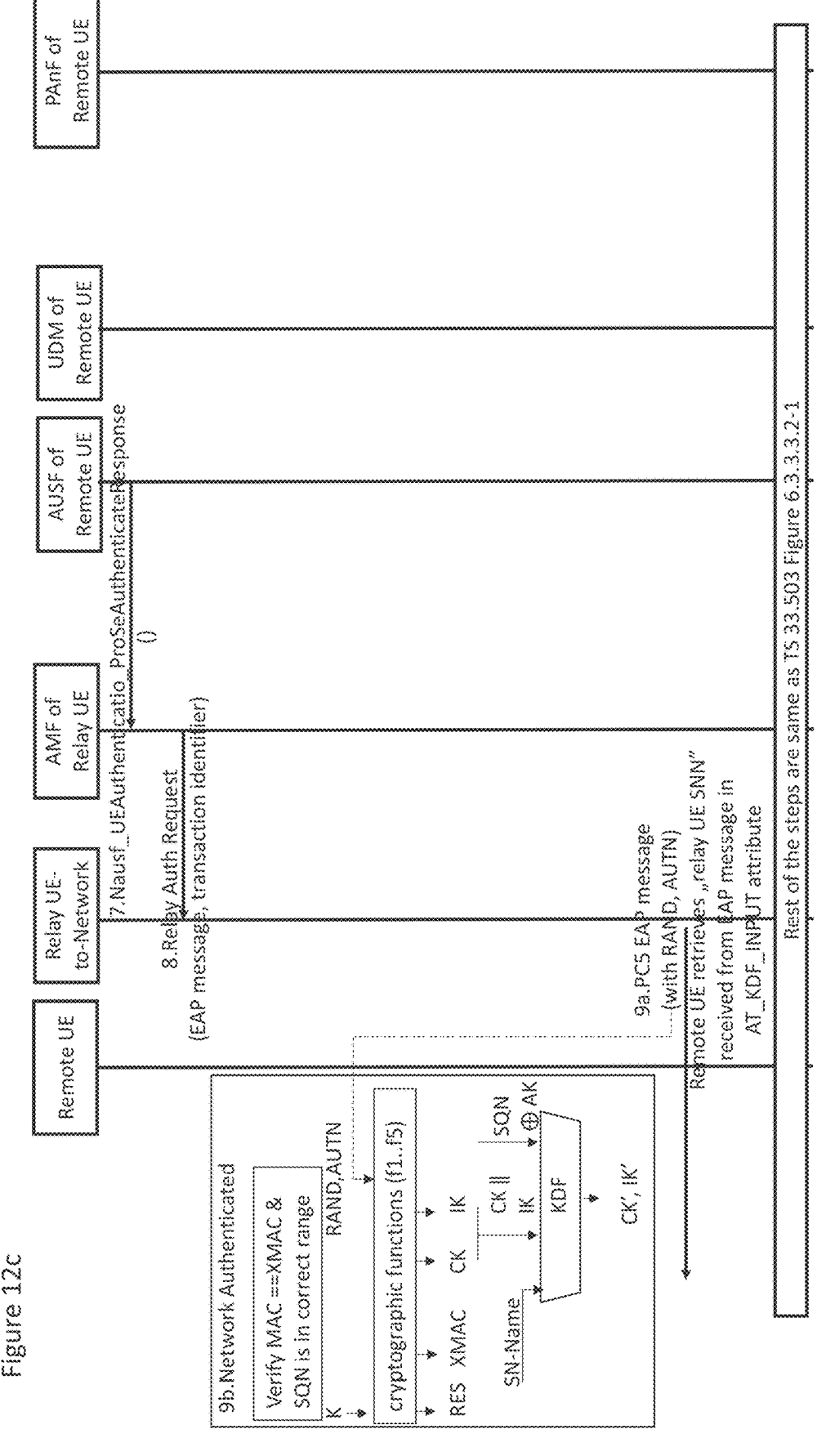

FIG. 12a, 12b and 12c shows an example signalling flow for ProSe EAP AKA' authentication according to the second approach.

Figure 13A:
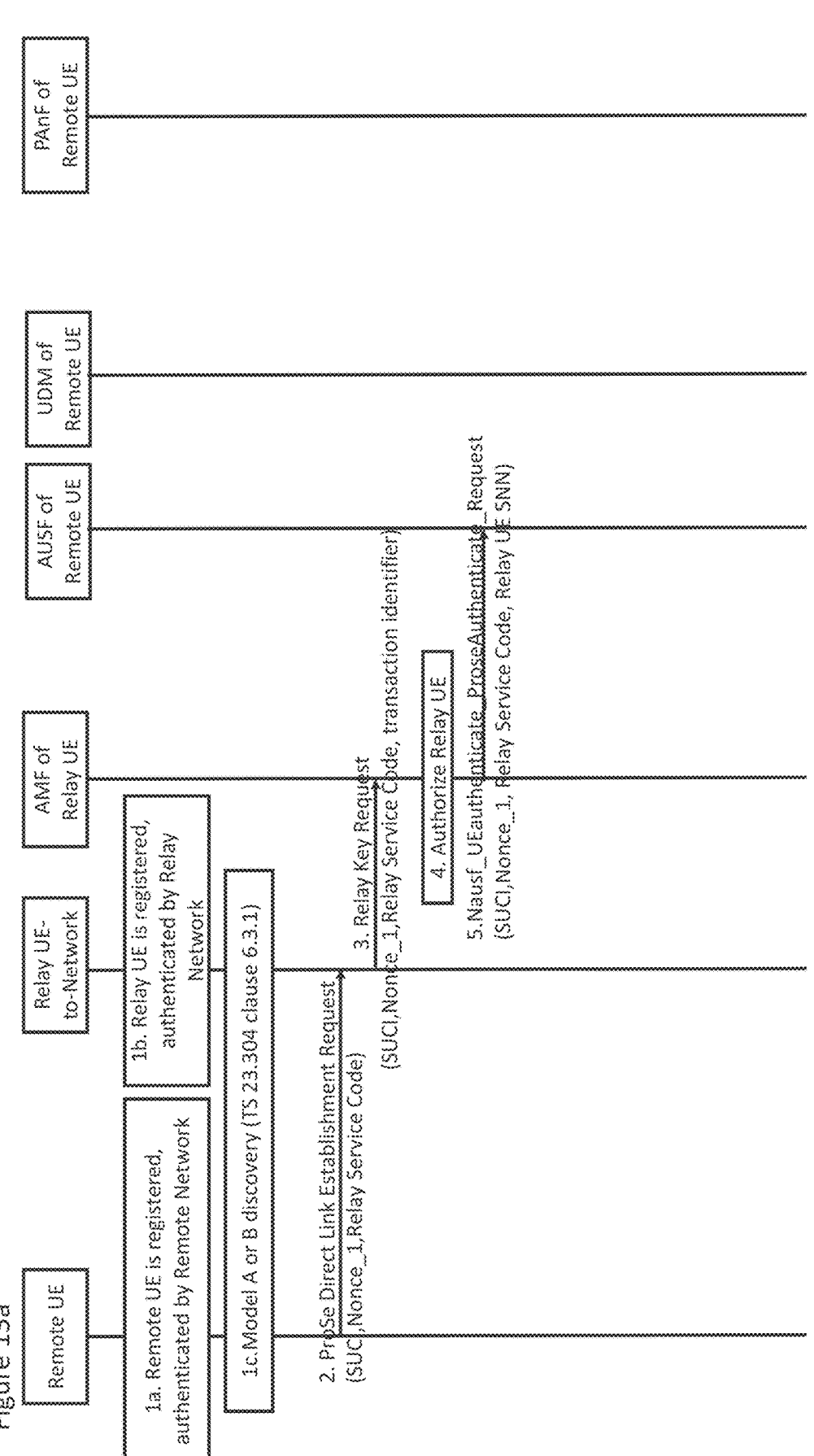
Figure 13C:
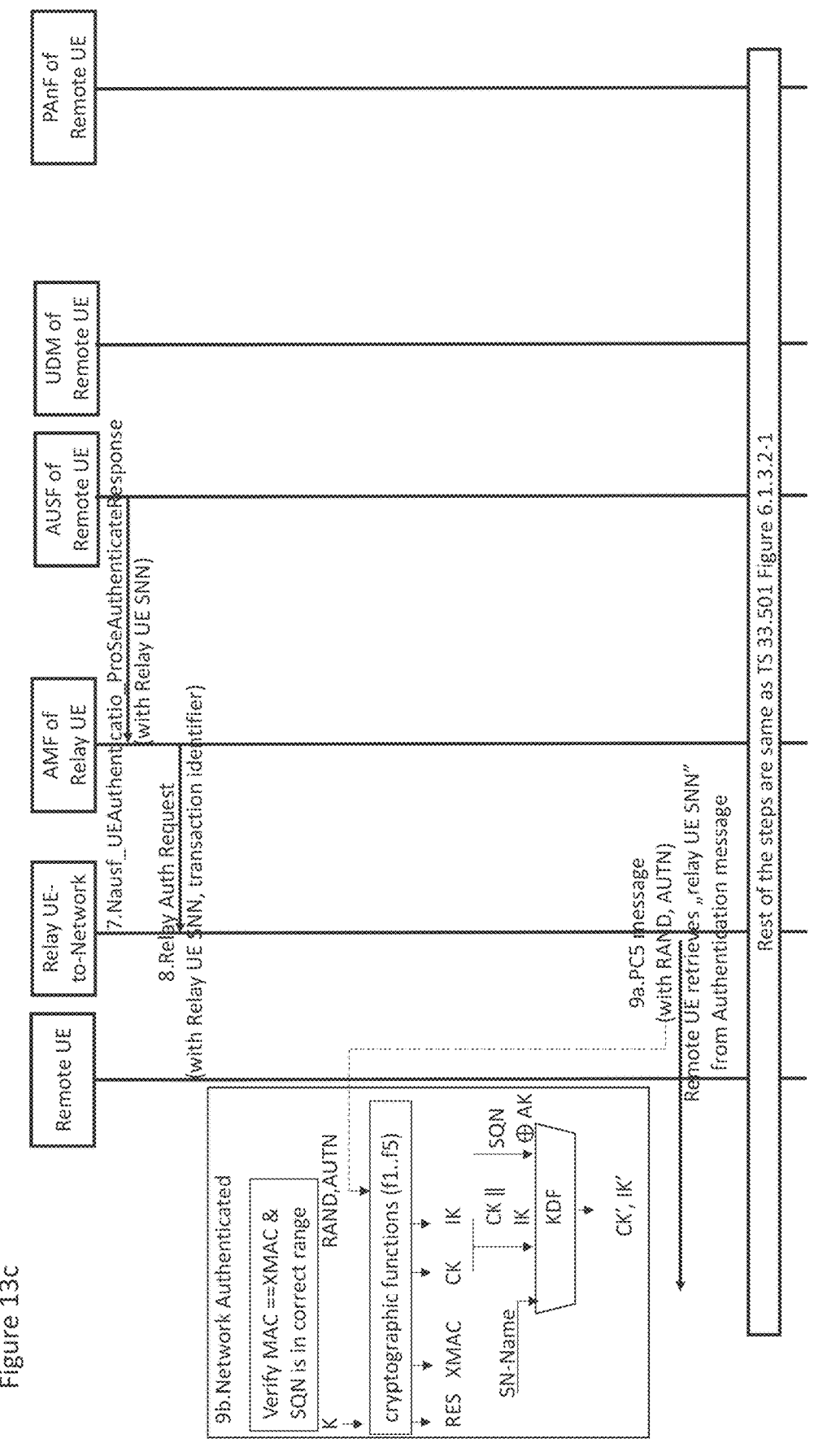

FIG. 13a, 13b and 13c shows an example signalling flow for ProSe 5G AKA authentication according to the second approach.

In FIGS. 12a, 12b and 12c and 13a, 13b and 13c, the AMF of Relay UE sends the "Relay UE SNN" in step 5 in Nausf_UEAuthenticate_ProseAuthenticate_Request message towards AUSF. The AUSF forwards the "Relay UE SNN" in step 6a in Nudm_UEAuthenticate_Get-ProseAV_Request message towards UDM. The "Relay UE SNN" is used in authentication vector generation.

In FIG. 12a, 12b and 12c, the same relay UE SNN is used in AT_KDF_INPUT and passed to UE/USIM in AKA challenge.

In FIG. 13a, 13b and 13c, the relay UE SNN is sent in 5G AKA authentication messages from UDM to AUSF then to the remote UE. The remote UE uses that "Relay UE SNN" in AKA challenge calculations of RES.

An apparatus at a network node may comprise means for receiving an indication of a serving network name of a first user equipment, the first user equipment configured to operate as a relay between a second user equipment and a network by providing a proximity-based service between the first user equipment and the second user equipment, means for determining an authentication vector for a proximity-based service authentication for the second user equipment based on the serving network name of the first user equipment; and means for providing an indication of the serving network name of the first user equipment to the second user equipment.

Alternatively, an apparatus at a network node may comprise means for obtaining a serving network name of a first user equipment and means for determining an authentication vector based on the serving network name of the first user equipment for a proximity-based service authentication for the first user equipment for a proximity-based service between the first user equipment and a second user equipment configured to operate as a relay between the first user equipment and a network.

The apparatus may comprise a network node, be the network node or be comprised in the network node or a chipset for performing at least some actions of/for the network node. The network node may implement a UDM.

An apparatus at a first user equipment may comprise means for receiving an indication of a serving network name of a second user equipment, the second user equipment configured to operate as a relay between the first user equipment and a network by providing a proximity-based service between the first user equipment and the second user equipment and means for determining an authentication vector for a proximity-based service authentication for the first user equipment based on the serving network name of the second user equipment.

Alternatively, or in addition, an apparatus may comprise means for obtaining a serving network name of a first user equipment at the first user equipment and means for determining an authentication vector based on the serving network name of the first user equipment for a proximity-based service authentication for the first user equipment for a proximity-based service between the first user equipment and a second user equipment configured to operate as a relay between the first user equipment and a network.

The apparatus may comprise the first user equipment, such as a mobile phone, be the first user equipment or be comprised in the first user equipment or a chipset for performing at least some actions of/for the user equipment.

A system may comprise means for receiving an indication of a serving network name of a first user equipment at a network node, the first user equipment configured to operate as a relay between a second user equipment and a network by providing a proximity-based service between the first user equipment and the second user equipment, means for determining an authentication vector for a proximity-based service authentication for the second user equipment based on the serving network name of the first user equipment; and means for providing an indication of the serving network name of the first user equipment to the second user equipment and means for receiving an indication of the serving network name of a first user equipment at the second user equipment, and means for determining the authentication vector for the proximity-based service authentication for the second user equipment based on the serving network name of the first user equipment.

A system may comprise means for obtaining a serving network name of a first user equipment at a network node and means for determining an authentication vector based on the serving network name of the first user equipment for a proximity-based service authentication for the first user equipment for a proximity-based service between the first user equipment and a second user equipment configured to operate as a relay between the first user equipment and a network and means for obtaining the serving network name of the first user equipment at the first user equipment and means for determining an authentication vector based on the serving network name of the first user equipment for a proximity-based service authentication for the first user equipment for a proximity-based service between the first user equipment and a second user equipment configured to operate as a relay between the first user equipment and a network.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. The term "non-transitory," as used herein, is a limitation of the medium itself (i.e., tangible, not a signal) as opposed to a limitation on data storage persistency (e.g., RAM vs. ROM).

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process.

Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus for a network node, comprising: at least one processor and at least one memory storing instructions that, when executed by the at least one processor, cause the apparatus at least to:
  receive an indication of a serving network name of a first user equipment, the first user equipment configured to operate as a relay between a second user equipment and a network by providing a proximity-based service between the first user equipment and the second user equipment;
  determine an authentication vector for a proximity-based service authentication for the second user equipment based on the serving network name of the first user equipment; and
  provide an indication of the serving network name of the first user equipment to the second user equipment.

2. The apparatus according to claim 1, further caused to:
  provide authentication information to the second user equipment, wherein the authentication information comprises the indication of the serving network name of the first user equipment.

3. The apparatus according to claim 2, further caused to:
  provide the authentication information in at least one of the following: a proximity-based service authentication response, a proximity-based service authentication request or an extensible authentication protocol message.

4. The apparatus according to claim 1, further caused to:
  receive the serving network name of the first user equipment via at least one of the following: an access and mobility management function associated with the first user equipment or an authentication server function associated with the second user equipment.

5. The apparatus according to claim 1, wherein the network node implements a unified data management.

6. A first user equipment, comprising: at least one processor and at least one memory storing instructions that, when executed by the at least one processor, cause the first user equipment at least to:
  receive an indication of a serving network name of a second user equipment, the second user equipment configured to operate as a relay between the first user equipment and a network by providing a proximity-based service between the first user equipment and the second user equipment; and
  determine an authentication vector for a proximity-based service authentication for the first user equipment based on the serving network name of the second user equipment.

7. The first user equipment according to claim 6, further caused to:
  receive authentication information at the first user equipment, wherein the authentication information comprises the indication of the serving network name of the second user equipment.

8. The first user equipment according to claim 7, further caused to:
  receive the authentication information in an extensible authentication protocol message.

9. A method comprising:
  receiving an indication of a serving network name of a first user equipment, the first user equipment configured to operate as a relay between a second user equipment and a network by providing a proximity-based service between the first user equipment and the second user equipment;
  determining an authentication vector for a proximity-based service authentication for the second user equipment based on the serving network name of the first user equipment; and
  providing an indication of the serving network name of the first user equipment to the second user equipment.

10. The method of claim 9, further comprising:
  providing authentication information to the second user equipment, wherein the authentication information comprises the indication of the serving network name of the first user equipment.

11. The method of claim 10, further comprising:
  providing the authentication information in at least one of the following: a proximity-based service authentication response, a proximity-based service authentication request or an extensible authentication protocol message.

12. The method of claim 9, further comprising:
  receiving the serving network name of the first user equipment via at least one of the following: an access and mobility management function associated with the first user equipment or an authentication server function associated with the second user equipment.

13. The method of claim 9, wherein the network node implements a unified data management.

14. A method comprising:

receiving an indication of a serving network name of a second user equipment, the second user equipment configured to operate as a relay between the first user equipment and a network by providing a proximity-based service between the first user equipment and the second user equipment; and determining an authentication vector for a proximity-based service authentication for the first user equipment based on the serving network name of the second user equipment.

15. The method of claim 14, further comprising:

receiving authentication information at the first user equipment, wherein the authentication information comprises the indication of the serving network name of the second user equipment.

16. The method of claim 15, further comprising:

receiving the authentication information in an extensible authentication protocol message.

\* \* \* \* \*